US012403573B2

(12) United States Patent
Pfeiffer

(10) Patent No.: US 12,403,573 B2
(45) Date of Patent: Sep. 2, 2025

(54) MULTI-TOOL

(71) Applicant: Wolf Tooth Components, LLC, Burnsville, MN (US)

(72) Inventor: Michael W. Pfeiffer, Eden Prairie, MN (US)

(73) Assignee: Wolf Tooth Components, LLC, Burnsville, MN (US)

( * ) Notice: Subject to any disclaimer, the term of this patent is extended or adjusted under 35 U.S.C. 154(b) by 271 days.

(21) Appl. No.: 17/989,511

(22) Filed: Nov. 17, 2022

(65) Prior Publication Data

US 2023/0072405 A1 Mar. 9, 2023

Related U.S. Application Data

(63) Continuation-in-part of application No. 16/351,484, filed on Mar. 12, 2019, now Pat. No. 11,623,329.

(60) Provisional application No. 63/280,616, filed on Nov. 17, 2021, provisional application No. 62/641,585, filed on Mar. 12, 2018.

(51) Int. Cl.
*B25B 27/00* (2006.01)
*B25B 23/00* (2006.01)
*B25G 1/08* (2006.01)

(52) U.S. Cl.
CPC ...... *B25B 27/0071* (2013.01); *B25B 23/0035* (2013.01); *B25G 1/085* (2013.01)

(58) Field of Classification Search
CPC .... B25F 1/02; B25F 1/003; B25F 1/04; B25B 7/22; B25B 27/0071; B25B 27/22; B25B 27/24; B25G 1/08; B25G 1/085
See application file for complete search history.

(56) References Cited

U.S. PATENT DOCUMENTS 1,510,953 A 10/1924 Murphy
D150,222 S 7/1948 Gile
(Continued)

FOREIGN PATENT DOCUMENTS

TW M485775 9/2014
TW 201531384 8/2015
(Continued)

OTHER PUBLICATIONS

BiB Creative Concept Store—Clever Tool (3 sets), retrieved Mar. 22, 2018, 2 pages, <http://bibcreative.bigcartel.com/product/clever-tool-3-sets>.

(Continued)

*Primary Examiner* — David B. Thomas
(74) *Attorney, Agent, or Firm* — Dicke, Billig & Czaja, PLLC

(57) ABSTRACT

A multi-tool includes a pair of plates having respective handle portions, joint portions, and head portions, with the plates pivotally connected to each other at the joint portions, and to be pivoted relative to each other to establish an open position and a closed position of the plates. A bit holder is extended from an end of one of the plates, with the bit holder including a socket to receive an insert bit, the handle portion of the one of the plates including a storage area to receive and store the insert bit, and, in the closed position of the plates, the plates to overlap each other with the handle portion of the other of the plates to cover the storage area and the handle portion of the one of the plates.

20 Claims, 41 Drawing Sheets

(56) References Cited

U.S. PATENT DOCUMENTS

| | | | | |
|---|---|---|---|---|
| 4,336,652 | A | 6/1982 | Robertson | |
| D288,893 | S | 3/1987 | Epstein | |
| 5,193,336 | A | 3/1993 | King | |
| 5,255,438 | A | 10/1993 | Morgan | |
| 5,280,659 | A * | 1/1994 | Park | B25F 1/003 7/128 |
| D358,536 | S | 5/1995 | Gore | |
| 5,421,225 | A * | 6/1995 | Chen | B25F 1/02 81/177.4 |
| 5,432,968 | A * | 7/1995 | Beck | B25F 1/006 7/128 |
| 5,564,318 | A | 10/1996 | Pail | |
| 5,910,174 | A * | 6/1999 | Finn | B25B 7/00 81/438 |
| D416,178 | S | 11/1999 | Moore | |
| D424,900 | S | 5/2000 | Budrow et al. | |
| 6,119,561 | A * | 9/2000 | Anderson | B25F 1/003 81/177.4 |
| 6,185,771 | B1 | 2/2001 | Trusty, Sr. | |
| D442,451 | S | 5/2001 | Berg | |
| 6,223,373 | B1 * | 5/2001 | Yeh | B25B 23/005 7/137 |
| D445,655 | S | 7/2001 | Maddox | |
| D448,637 | S | 10/2001 | Yeh | |
| 6,305,254 | B1 * | 10/2001 | Hsieh | B25B 13/04 81/177.4 |
| 6,804,869 | B1 | 10/2004 | Tong | |
| 7,162,758 | B2 * | 1/2007 | Skinner | G01C 9/26 7/164 |
| 7,334,502 | B1 * | 2/2008 | Durkee | B25G 1/085 81/20 |
| 7,346,986 | B2 | 3/2008 | Feith | |
| 7,587,963 | B1 | 9/2009 | Broadus | |
| D613,138 | S | 4/2010 | Salvino | |
| 7,845,254 | B2 * | 12/2010 | Lionel | B25F 1/02 81/414 |
| 8,176,814 | B1 | 5/2012 | Bernstein et al. | |
| D666,883 | S | 9/2012 | Howard | |
| D689,351 | S | 9/2013 | Webb, Jr. | |
| 9,225,153 | B1 * | 12/2015 | Anderson | H02G 1/1214 |
| D747,638 | S | 1/2016 | Hernandez | |
| D752,402 | S | 3/2016 | Goldy et al. | |
| D768,460 | S | 10/2016 | Adelman | |
| 9,457,460 | B2 | 10/2016 | Hermansen et al. | |
| D772,028 | S | 11/2016 | Tangreen | |
| 10,035,248 | B2 | 7/2018 | Ichikawa | |
| D832,673 | S | 11/2018 | Berman | |
| D837,619 | S | 1/2019 | George | |
| D842,067 | S | 3/2019 | Young | |
| D848,808 | S | 5/2019 | Zhong | |
| 10,464,199 | B2 * | 11/2019 | Hardinge | B25F 1/04 |
| D878,890 | S | 3/2020 | Riehl | |
| D886,564 | S | 6/2020 | Dittmer et al. | |
| 10,850,382 | B1 * | 12/2020 | Ragner | B25F 1/003 |
| 11,794,313 | B2 * | 10/2023 | Bessac | B25B 7/10 |
| D1,007,266 | S | 12/2023 | Fu | |
| 2003/0154552 | A1 * | 8/2003 | Oka | B25B 7/10 7/127 |
| 2007/0122574 | A1 * | 5/2007 | Brown | B25F 1/02 428/34.1 |
| 2009/0211034 | A1 * | 8/2009 | Lionel | B25F 1/02 7/127 |
| 2010/0293721 | A1 | 11/2010 | James | |
| 2012/0118115 | A1 | 5/2012 | Huang | |
| 2013/0097786 | A1 * | 4/2013 | Hardinge | B25F 1/04 30/162 |
| 2016/0082793 | A1 | 3/2016 | Davidson et al. | |
| 2017/0157757 | A1 | 6/2017 | Winefordner et al. | |
| 2017/0266803 | A1 * | 9/2017 | Hardinge | B25G 3/18 |
| 2017/0348830 | A1 * | 12/2017 | Lazenby | B26B 17/00 |
| 2018/0093369 | A1 | 4/2018 | Ichikawa | |
| 2019/0061126 | A1 | 2/2019 | Park et al. | |
| 2019/0275651 | A1 | 9/2019 | Dittmer et al. | |
| 2020/0171642 | A1 * | 6/2020 | Newman | B25F 1/04 |
| 2020/0191240 | A1 | 6/2020 | Chuang | |
| 2020/0306935 | A1 * | 10/2020 | Bessac | B25F 1/003 |
| 2023/0072405 | A1 | 3/2023 | Pfeiffer | |
| 2023/0364813 | A1 | 11/2023 | Liang et al. | |

FOREIGN PATENT DOCUMENTS

| | | |
|---|---|---|
| TW | M505986 | 8/2015 |
| TW | 201634194 | 10/2016 |
| TW | M536595 | 2/2017 |
| TW | M545025 | 7/2017 |
| TW | M545057 | 7/2017 |
| TW | M546272 | 8/2017 |
| TW | M546273 | 8/2017 |
| TW | M549279 | 9/2017 |
| TW | M549280 | 9/2017 |
| TW | M554399 | 1/2018 |
| TW | M554400 | 1/2018 |

OTHER PUBLICATIONS

Bikerumor Clever Standard Makes Quick Work of Re-using Chain Quick Links, Nov. 28, 2016, 3 pages, <https://www.bikerumor.com/2016/11/28/clever-standard-makes-quick-work-re-using-chain-quick-links/>.

KMC MissingLink Lever, retrieved Mar. 22, 2018, 1 page, <https://store.kmcchain.us/p/missinglink-lever>.

Moosetreks 2 in 1 Bike Tire Levers + Master Link Chain Pliers, retrieved Mar. 22, 2018, 10 pages, <https://www.amazon.com/Moosetreks-Levers-Premium-Engineering-Plastic/dp/B074QM8NK2>.

Park Tool Master Link Pliers MLP-1.2, retrieved Mar. 22, 2018, 2 pages, <https://www.parktool.com/product/master-link-pliers-mlp-1-2>.

Sumnacon Bike Tire Levers + Master Link Chain Pliers—Sumnacon 3 in 1 Multifunction Bicycle Tire Repair Tool, retrieved Mar. 22, 2018, 11 pages, <https://www.amazon.com/Bike-Levers-Master-Chain-Pliers/dp/B078HK9NPP/ref=sr_1_17?s=spo>.

LEZYNE Multi-Chain Bicycle Pliers, Apr. 29, 2020 [online], [retrieved Jul. 24, 2024]. Retrieved from internet, https://www.amazon.com/dp/B087WQ7CZZ/ref=sspa_dk_detail_1?pf_rd_p=953c7d66-4120-4d22-a777- (see last page of attached pdf for full URL) (Year: 2020).

8-Bit Pack Pliers, Nov. 17, 2020 [online], [retrieved Jul. 24, 2024]. Retrieved from internet, https://www.wolftoothcomponents.com/collections/tools/products/8-bitpack-pliers (Year: 2020).

Multi-Functional Master Link Pliers with Master Link Removing, May 27, 2023 [online], [retrieved Jul. 24, 2024]. Retrieved from internet, https://www.amazon.com/KIEVODE-Multi-Functional-Master-Removing-Storage/dp/B0C6GP5249/ref=sr_1_14? (see last page of attached pdf for full URL) (Year: 2023).

* cited by examiner

MULTI-TOOL

CROSS-REFERENCE TO RELATED APPLICATIONS

This application is a Continuation-in-Part of U.S. patent application Ser. No. 16/351,484 filed on Mar. 12, 2019, which claims priority under 35 U.S.C. 119(e) to U.S. Provisional Patent Application Ser. No. 62/641,585 filed on Mar. 12, 2018, and this application claims priority under 35 U.S.C. 119(e) to U.S. Provisional Patent Application Ser. No. 63/280,616 filed on Nov. 17, 2021, each of which is incorporated herein by reference.

BACKGROUND

The present disclosure relates generally to a multi-tool and, more specifically, relates to a multi-tool for use with a bicycle.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Figure 1:
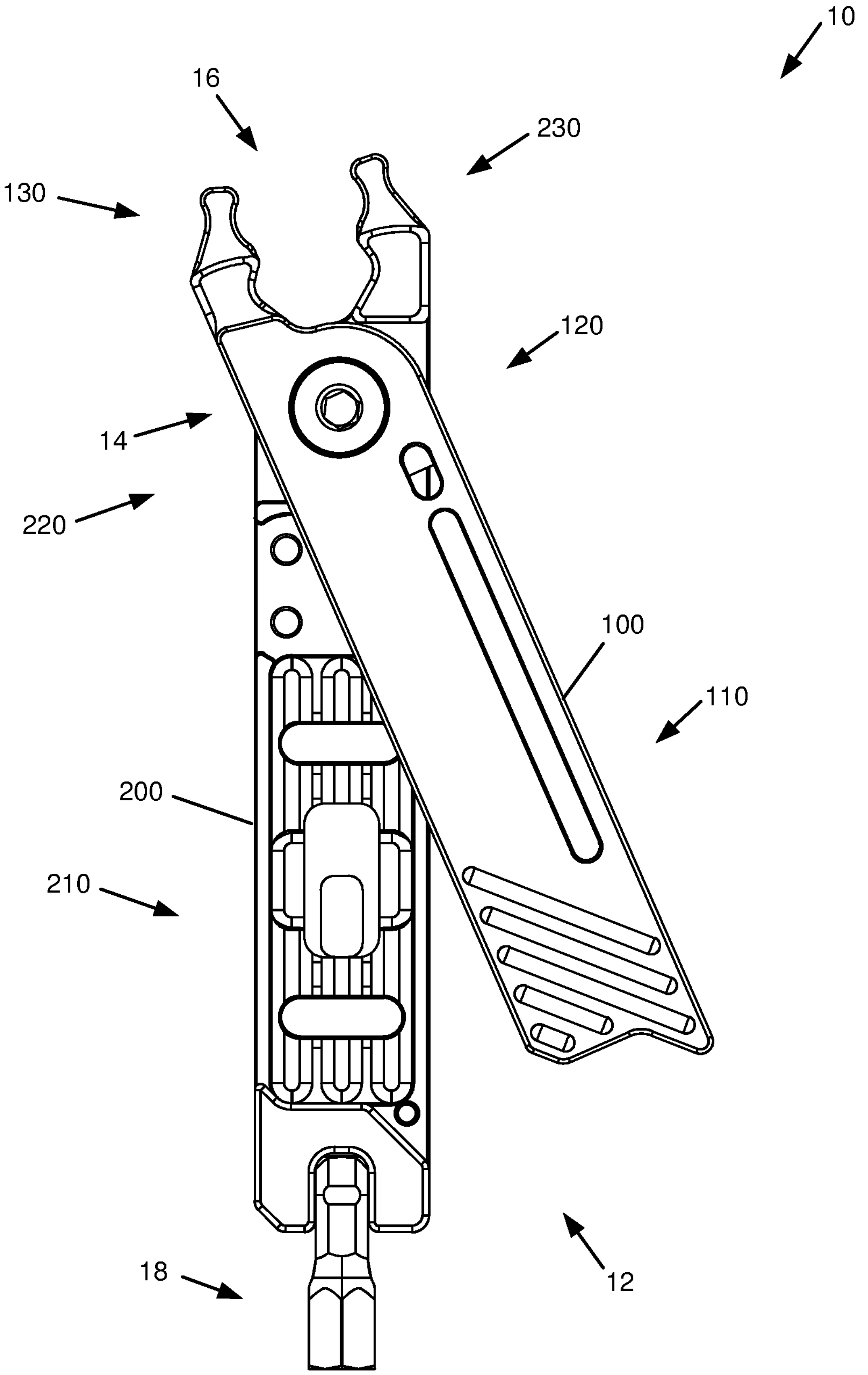
FIGS. 1 and 2 are front and rear views, respectively, of an example of a multi-tool.
Figure 2:
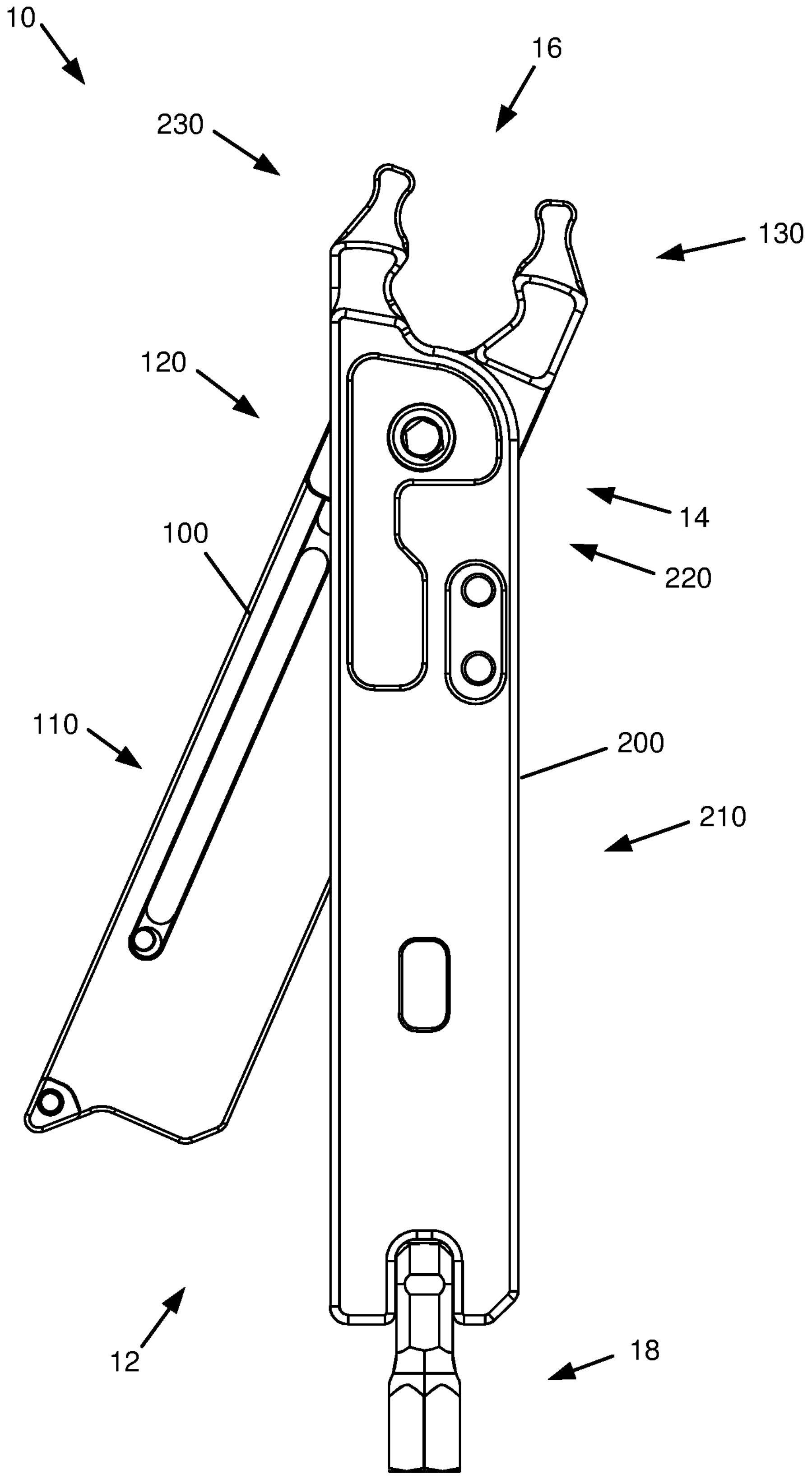

FIGS. 1 and 2 are front and rear views, respectively, of an example of a multi-tool 10. In one example, multi-tool 10 includes handles 12, joint 14, head 16, and bit holder 18. As disclosed herein, handles 12 are pivotally connected at joint 14. As such, head 16 may be opened and/or closed (or expanded and/or retracted) by actuation of handles 12. In the illustrated example, multi-tool 10 is formed by a pair of plates 100 and 200, with plates 100 and 200 having respective handle portions 110 and 210, joint portions 120 and 220, and head portions 130 and 230. In addition, bit holder 18 is pivotally or rotatably coupled with one of the plates (for example, plate 200) such that bit holder 18 may be swiveled, pivoted or rotated between different positions, as disclosed herein.

Figure 3:
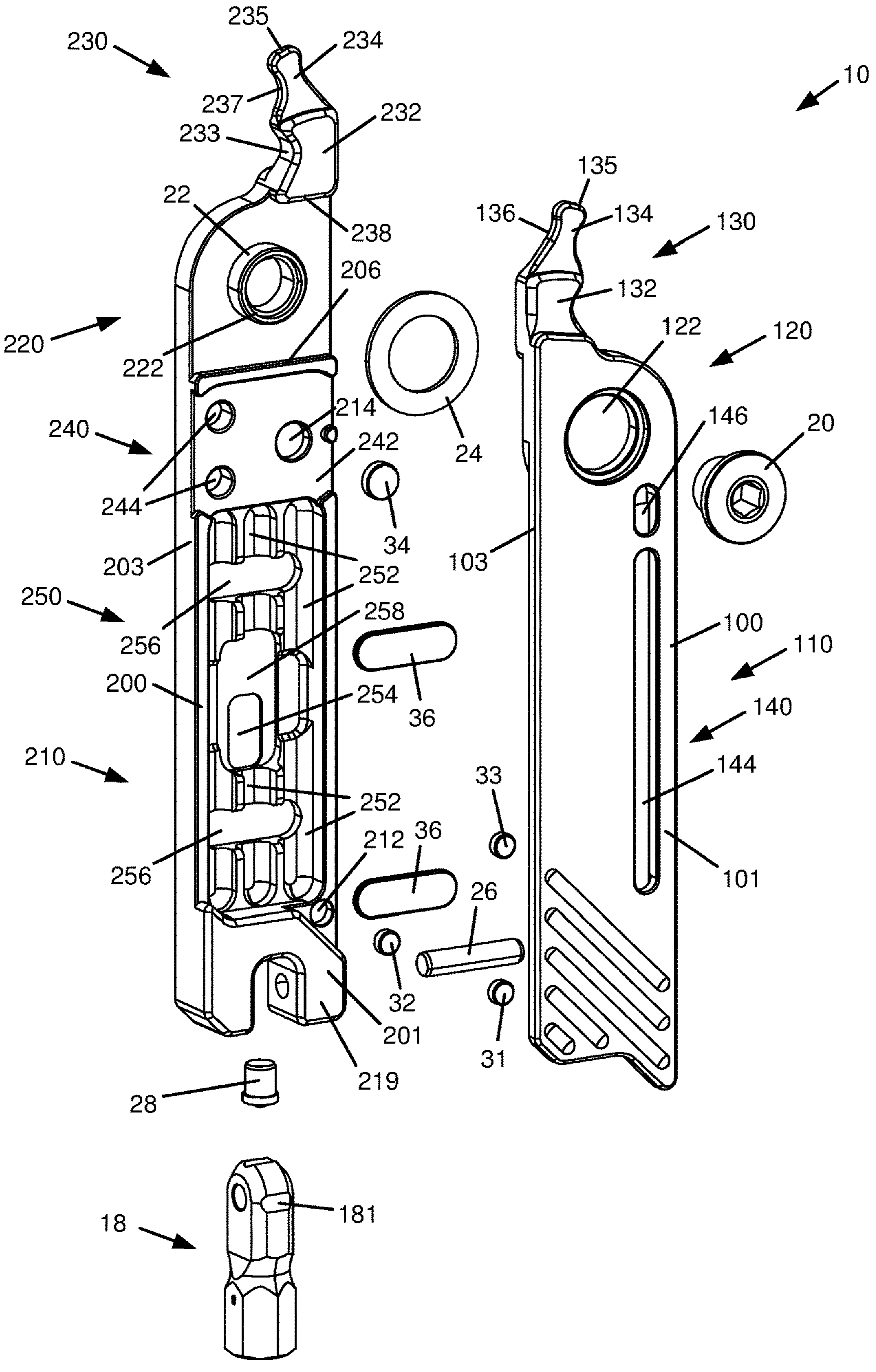
FIGS. 3 and 4 are exploded front perspective views of an example of the multi-tool of FIGS. 1 and 2.
Figure 4:
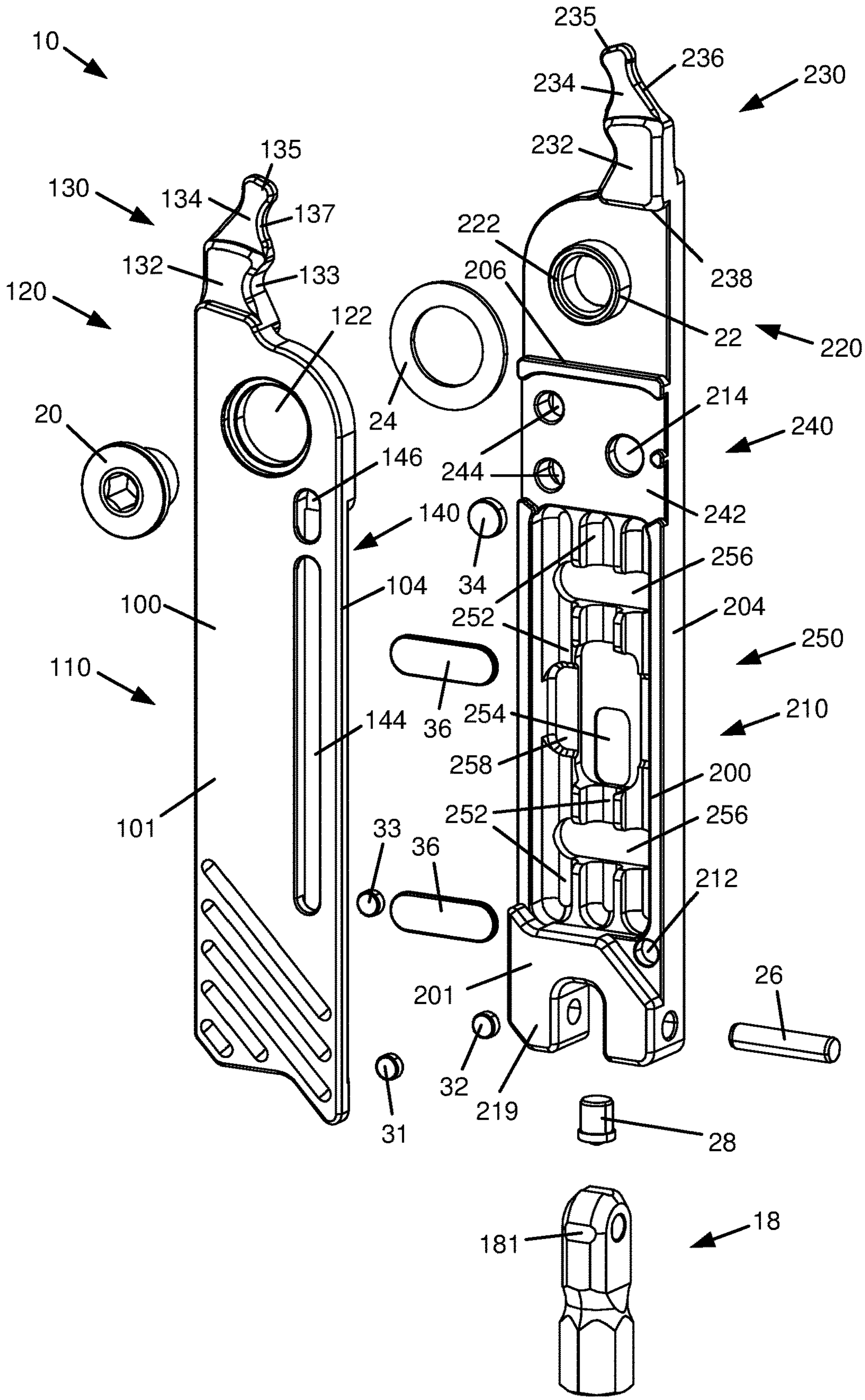
Figure 5:
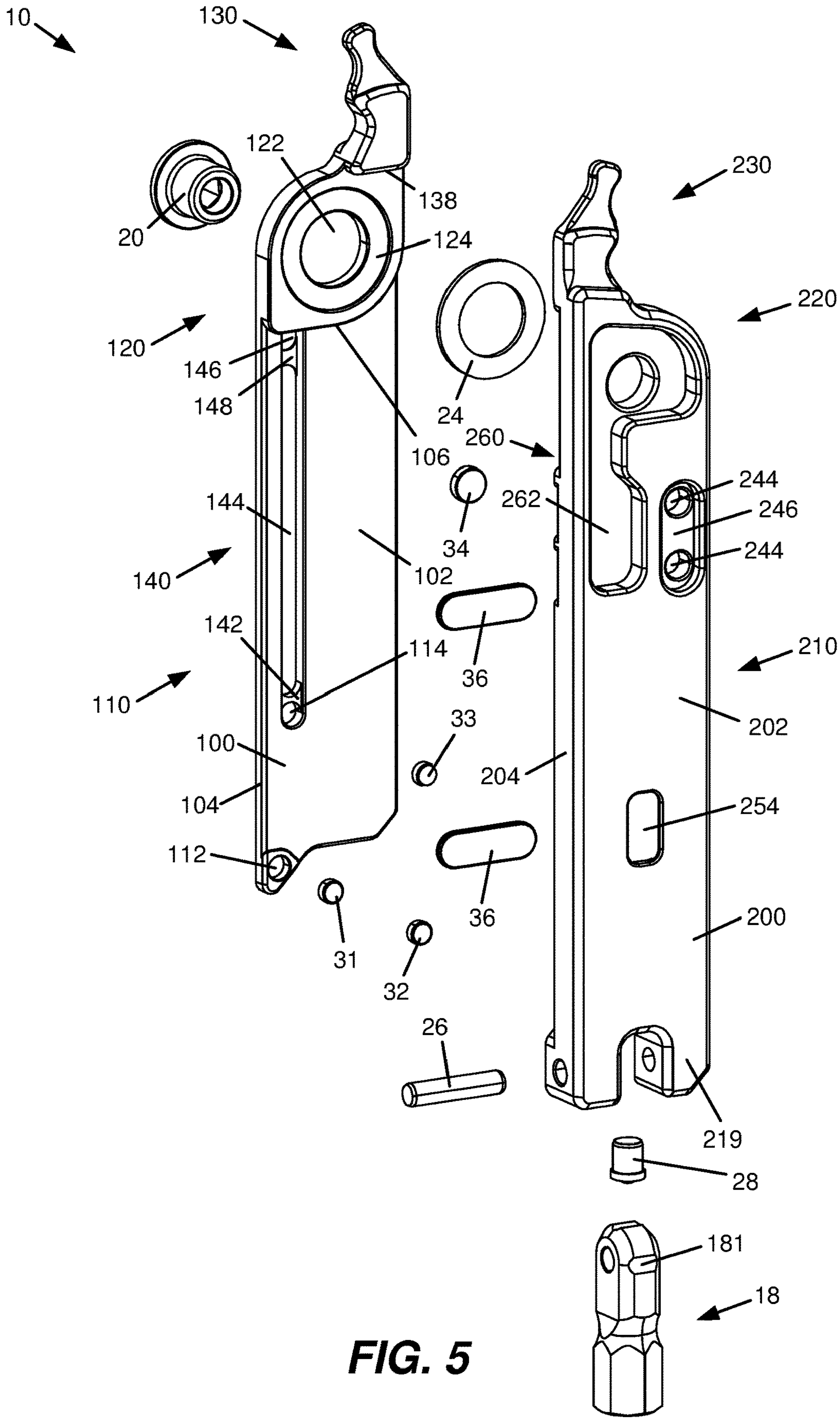
FIGS. 5 and 6 are exploded rear perspective views of an example of the multi-tool of FIGS. 1 and 2.
Figure 6:
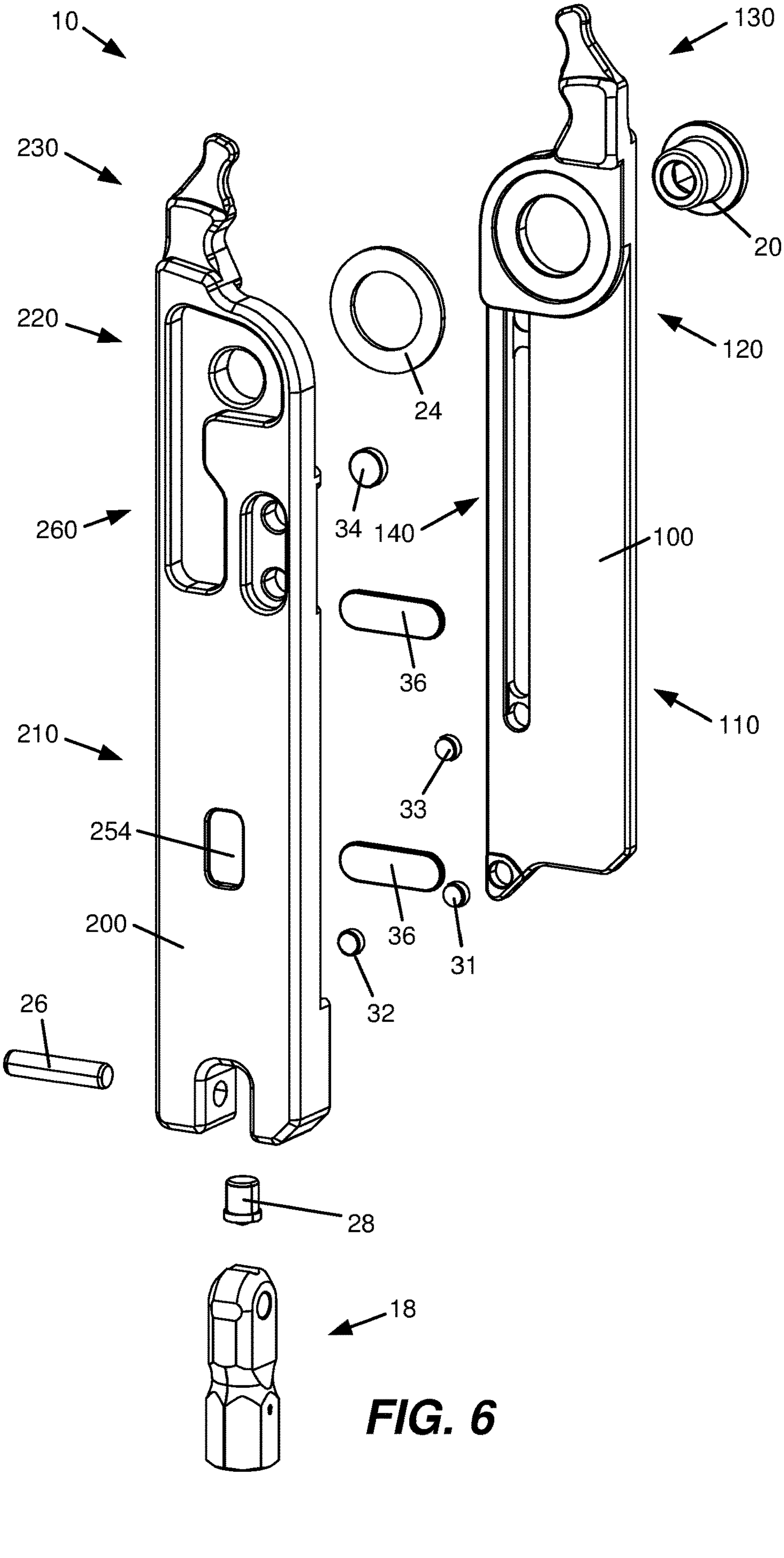

FIGS. 3 and 4 are exploded front perspective views of multi-tool 10, and FIGS. 5 and 6 are exploded rear perspective views of multi-tool 10. In one implementation, plate 100 has opposite sides 101 and 102, and opposite edges 103 and 104, and plate 200 has opposite sides 201 and 202, and opposite edges 203 and 204. In one implementation, edges 103 and 104 and edges 203 and 204 extend along respective handle portions 110 and 210 and respective joint portions 120 and 220 of respective plates 100 and 200.

As disclosed herein, plates 100 and 200 are pivotally connected such that sides 102 and 201 of respective plates 100 and 200 oppose or face each other in a closed position. In one example, in the closed position, plates 100 and 200 nest or overlap with each other. As such, edges 103 and 203 of respective plates 100 and 200 are substantially aligned, and edges 104 and 204 of respective plates 100 and 200 are substantially aligned (see, e.g., FIG. 7). In one example, handle portions 110 and 210 of respective plates 100 and 200 are each of a generally rectangular shape and, in one implementation, include beveled and/or rounded edges.

In one implementation, a thickness T1 of handle portion 110 of plate 100 is less than a thickness T2 of joint portion 120 of plate 100 (see, e.g., FIG. 13) such that a shoulder 106 is formed on side 102 of plate 100. In addition, in one implementation, a thickness T3 of joint portion 220 of plate 200 is less than a thickness T4 of handle portion 210 of plate 200 (see, e.g., FIG. 14) such that a shoulder 206 is formed on side 201 of plate 200.

In the illustrated example, joint 14 includes a bolt 20 and a post 22. In one implementation, joint portion 120 of plate 100 has a hole 122 formed therethrough, and post 22 is formed on joint portion 220 of plate 200. In one implementation, post 22 extends into and/or passes through hole 122 such that plate 100 is rotatably supported by (or rotatably supported on) post 22. In addition, in one implementation, post 22 includes internal threads 222. As such, in one implementation, bolt 20 extends into and/or passes through hole 122, and is threaded into post 22 to pivotally couple plates 100 and 200. In one implementation, bolt 20 is a chainring bolt. Bolt 20, therefore, may be used to replace a chainring bolt on a bicycle.

In one implementation, joint 14 includes a washer 24 interposed between joint portions 120 and 220 of respective plates 100 and 200. As such, washer 24 helps to space apart or position plates 100 and 200 relative to each other and provides a bearing surface for pivotal movement of plates 100 and 200 relative to each other. Washer 24 is supported by (or on) post 22 and, in one implementation, is fit within a recess 124 formed in side 012 of plate 100. In one example, washer 24 is formed of a polymer material, including, for example, an acetal, such as Delrin, or a polyamide, such as Nylon.

In the illustrated example, head portions 130 and 230 extend from an end of respective plates 100 and 200. In one implementation, head portions 130 and 230 each have respective jaw sections 132 and 232 and respective tips 134 and 234. Jaw sections 132 and 232 oppose each other and, as disclosed herein, together form gripping jaws 17 of multi-tool 10 (see, e.g., FIG. 19). In one implementation, jaw sections 132 and 232 include respective and opposing gripping surfaces 133 and 233 (see also FIG. 19). In one example, gripping surfaces 133 and 233 each have a concave shape, including, for example, a concave arcuate shape, a U-shape, or a V- or shallow V-shape.

In one example, tips 134 and 234 are configured to disengage and/or engage or remove and/or install a chain link of a roller chain, such as a master link for a roller chain of a bicycle, including, for example, a Quick-Link by Shimano. More specifically, as disclosed herein, tips 134 and 234 are sized and shaped such that tips 134 and 234 may engage teeth receiving openings formed by spaced link plates of a roller chain. In one implementation, tips 134 and 234 are sized and shaped as single or individual teeth. As such, tips 134 and 234 have respective ends 135 and 235 and respective faces or engaging surfaces 136, 137 and 236, 237 (see also FIG. 19). In one example, engaging surfaces 136, 137 and 236, 237 each have a concave shape, including, for example, a concave arcuate shape.

In the illustrated example, head portions 130 and 230 of respective plates 100 and 200 include respective shoulders 138 and 238. In one implementation, as disclosed herein, shoulders 138 and 238 limit or stop rotation of plates 100 and 200 relative to each other.

In one example, handles 12 are magnetically attracted to each other. More specifically, in one implementation, handle portions 110 and 210 include respective magnetic elements 31 and 32. As such, as disclosed herein, magnetic elements 31 and 32 provide a magnetic closure to and magnetically couple handle portions 110 and 210 of respective plates 100 and 200.

In one example, magnetic elements 31 and 32 are attached to, secured to, or positioned on or in opposing sides of respective handle portions 110 and 210. For example, magnetic element 31 of handle portion 110 is attached to, secured to, or positioned on or in side 102 of plate 100, and magnetic element 32 of handle portion 210 is attached to, secured to, or positioned on or in side 201 of plate 200. In the illustrated example, magnetic elements 31 and 32 are attached to, secured to, or positioned on or in opposing sides of respective handle portions 110 and 210 within respective recesses or cavities 112 and 212.

In one example, magnetic element 32 is or includes a magnet, and magnetic element 31 is or includes a magnet or is or includes an element (i.e., keeper) formed of a material to which a magnet may be attracted (e.g., a ferrous material). Magnetic elements 31 and 32 each may be a disk, plate, strip, or sheet, and each may be of a circular, rectangular, or other shape.

In the illustrated example, bit holder 18 is pivotally or rotatably coupled with plate 200. More specifically, in one implementation, bit holder 18 is pivotally or rotatably coupled with plate 200 such that bit holder 18 is extended from an end 219 of handle portion 210 of plate 200. In one example, bit holder 18 is pivotally or rotatably coupled with plate 200 by a pin 26. In examples, bit holder 18 is pivotally or rotatably coupled with plate 200 such that bit holder 18 may be swiveled, pivoted or rotated between different positions. In examples, bit holder 18 may be swiveled, pivoted or rotated in multiple directions to establish multiple positions of bit holder 18. In one implementation, a detent 28 may be provided at (adjacent or near) end 219 of plate 200 to help maintain a position of bit holder 18 as bit holder 18 is moved or swiveled, pivoted or rotated between different positions. In one example, bit holder 18 may include one or more than groove 181 which may be engaged by detent 28 to establish the different positions of bit holder 18.

In the illustrated example, bit holder 18 is a hex head and includes a hex socket 30 (FIG. 15) to receive a hex insert bit, as an example of an insert bit, as disclosed herein. As such, in examples, bit holder 18 may be used as a hex key wrench or as a driver for a hex insert bit (i.e., bit driver). In one implementation, a magnet (not shown) may be provided within bit holder 18 to help hold a respective insert bit within bit holder 18.

In examples, plate 100 (including handle portion 110 of plate 100) includes a storage area 140. In one implementation, storage area 140 is configured to receive and store a rasp, as disclosed herein. In the illustrated example, storage area 140 includes a recessed region 142 formed in side 102 of plate 100 and a slot 144 formed in plate 100 within recessed region 142. In addition, storage area 140 includes a pocket 146 at an end of recessed region 142 and a crossbar 148 across slot 144.

In one example, a magnetic element 33 is provided within recessed region 142 to help retain or hold a rasp within recessed region 142 and slot 144, as disclosed herein. In the illustrated example, magnetic element 33 is attached to, secured to, or positioned on or in side 102 of plate 100 within a recess or cavity 114. In one example, magnetic element 33 is or includes a magnet, and may be a disk, plate, strip, or sheet, and may be of a circular, rectangular, or other shape.

In examples, plate 200 (including handle portion 210 of plate 200) includes one or more than one storage area. In one implementation, plate 200 (including handle portion 210 of plate 200) includes a storage area 240, a storage area 250, and a storage area 260.

In one implementation, storage area 240 is configured to receive and store a chain link for a roller chain, such as a master link for a roller chain of a bicycle, including, for example, a Quick-Link by Shimano, as disclosed herein. In the illustrated example, storage area 240 includes a recessed region 242 formed in side 201 of plate 200 and one or more than one hole 244 formed through plate 200 within recessed region 242. As disclosed herein, recessed region 242 is configured to receive and store a link plate of a roller chain and hole 244 is configured to receive a link pin extended from the link plate.

In one example, recessed region 242 is configured to receive and store multiple chain links. In the illustrated example, recessed region 242 is configured to receive and store two chain links (i.e., one pair (or one set) of mating chain link plates), and includes two holes 244, each to receive a respective link pin. In one example, holes 244 communicate with a common recess 246 at side 202 of plate 200. In other examples, each hole 244 may include a corresponding recess 246, such as a countersink, counterbore, spot face or other recess, at side 202 of plate 200.

In one example, a magnetic element 34 is provided within recessed region 242 to help retain or hold a chain link within recessed region 242 of storage area 240, as disclosed herein. In the illustrated example, magnetic element 34 is attached to, secured to, or positioned on or in side 201 of plate 200 within a recess or cavity 214. In one example, magnetic element 34 is or includes a magnet, and may be a disk, plate, strip, or sheet, and may be of a circular, rectangular, or other shape.

In one implementation, storage area 250 is configured to receive and store a plurality of insert bits, as disclosed herein. More specifically, in the illustrated example, storage area 250 includes a plurality of cavities or pockets 252 for holding or storing insert bits. In one implementation, pockets 252 are each sized to receive a respective insert bit. In the illustrated example, pockets 252 are contiguous and include two rows of three pockets. As such, in the illustrated example, a total of six insert bits may be stored in pockets 252. Although two rows of three pockets each are illustrated and described, the number and/or configuration or arrangement of pockets 252 may vary.

In the illustrated example, an opening 254 is provided in plate 200 within storage area 250. In one implementation, opening 254 communicates with one or more than one pocket 252 such that an insert bit positioned within the respective pocket 252 may be accessed through opening 254. As such, a respective insert bit may be more easily removed from a respective pocket 252, as disclosed herein.

In one example, one or more than one magnetic element 36 is provided within storage area 250 to help hold or retain insert bits within respective pockets 252. In one implementation, magnetic element 36 is positioned within a recesses or cavity 256 communicated with one or more than one pocket 252. In the illustrated example, cavity 256 extends along multiple pockets 252 such that one magnetic element 36 extends along multiple pockets 252. In one implementation, magnetic elements 36 are positioned within respective recesses or cavities 256 provided in first and second rows of pockets 252. As such, in one implementation, two magnetic elements 36 are used for six pockets 252. Although illustrated as being oblong in shape, magnetic elements 36 may be of a circular, rectangular, or other shape, and may be a disk, plate, strip, or sheet.

In one implementation, storage area 260 is configured to receive and store a wrench. More specifically, in one example, storage area 260 is configured to receive and store a combination spoke wrench and valve core wrench, as disclosed herein. In the illustrated example, storage area 260 includes a recessed region 262 formed in side 202 of plate 200. In one example, magnetic element 34 is positioned opposite recessed region 262 such that magnetic element 34 helps to retain or hold a wrench within recessed region 262 of storage area 260, as disclosed herein.

Figure 7:
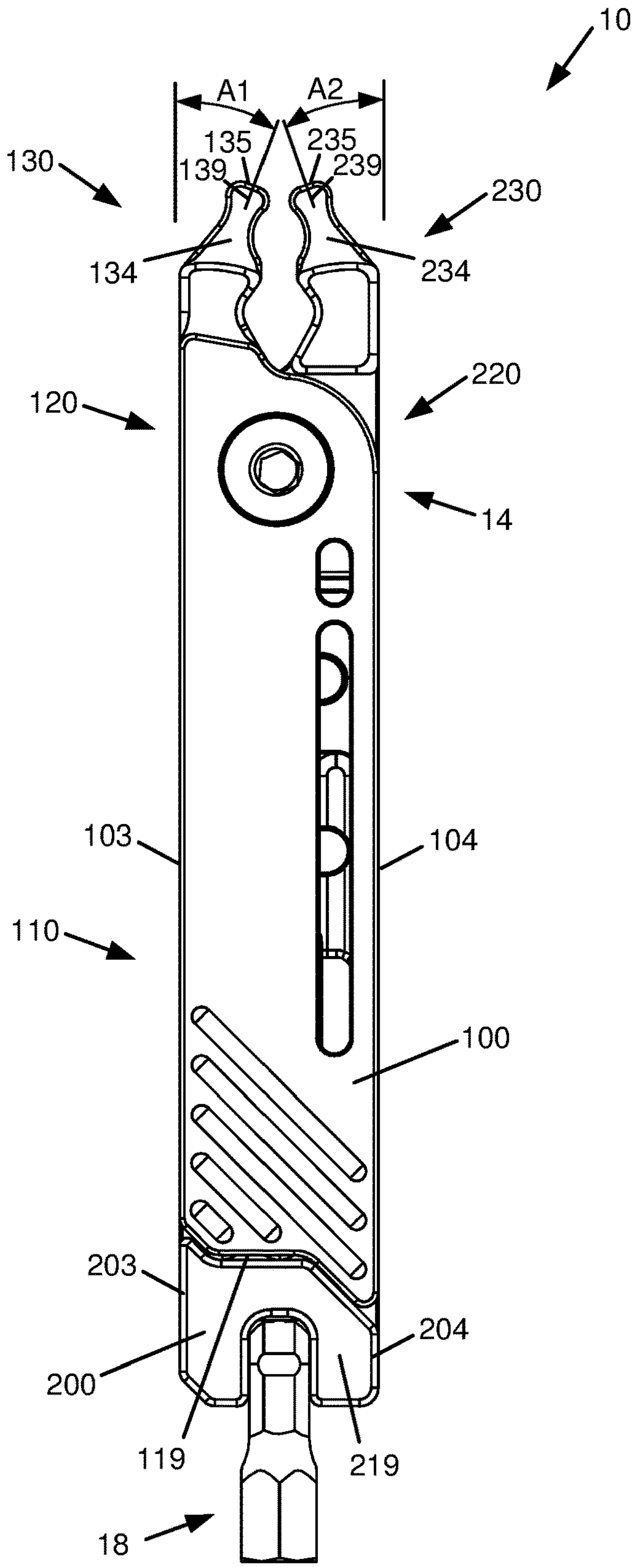
FIGS. 7 and 8, 9 are front and front perspective views, respectively, of the multi-tool of FIGS. 1 and 2 in a closed position, with a bit holder of the multi-tool in a first position.
Figure 8:
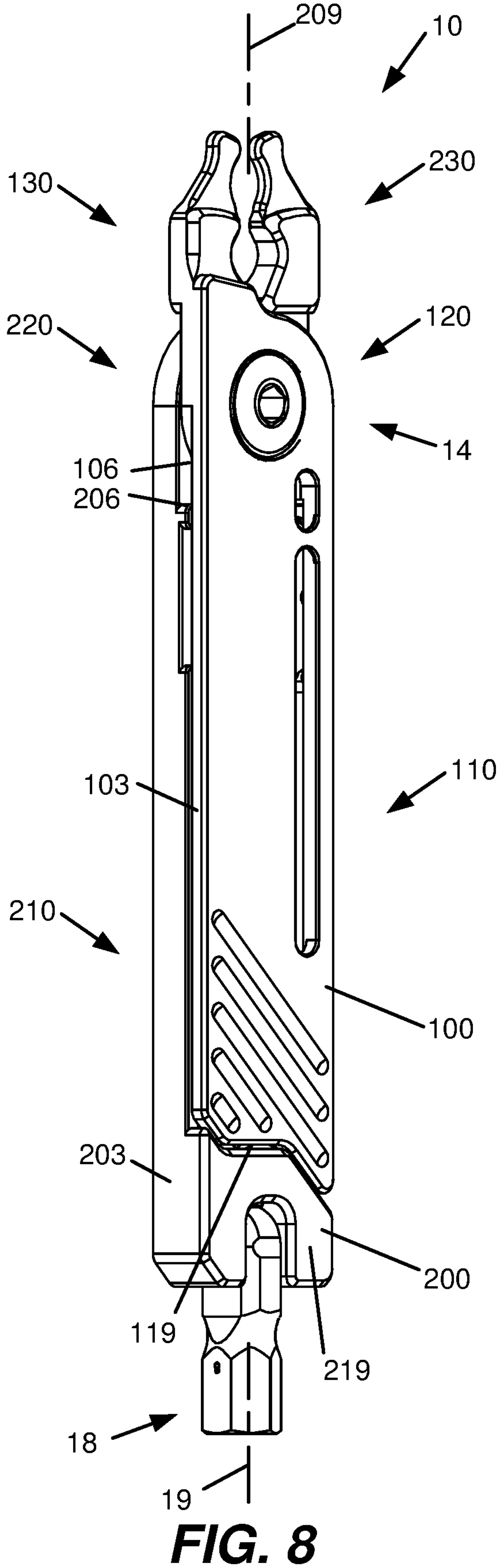
Figure 9:
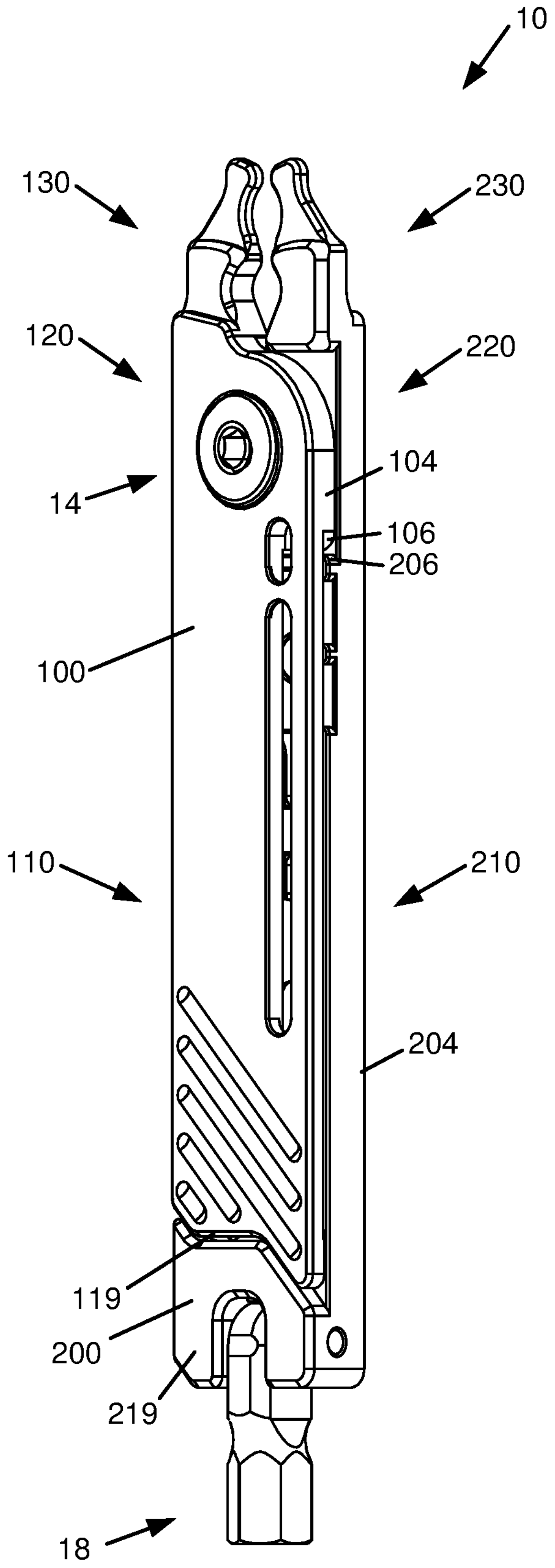
Figure 10:
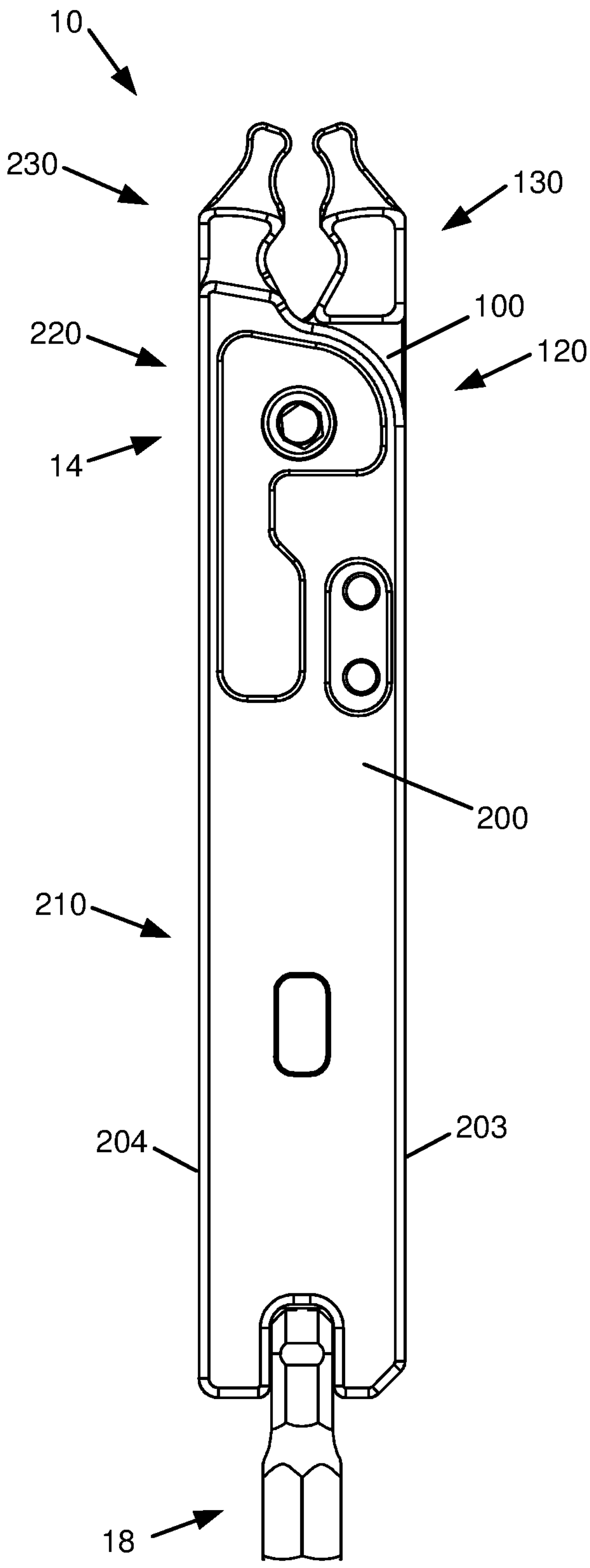
FIGS. 10 and 11, 12 are rear and rear perspective views, respectively, of the multi-tool of FIGS. 1 and 2 in a closed position.
Figure 11:
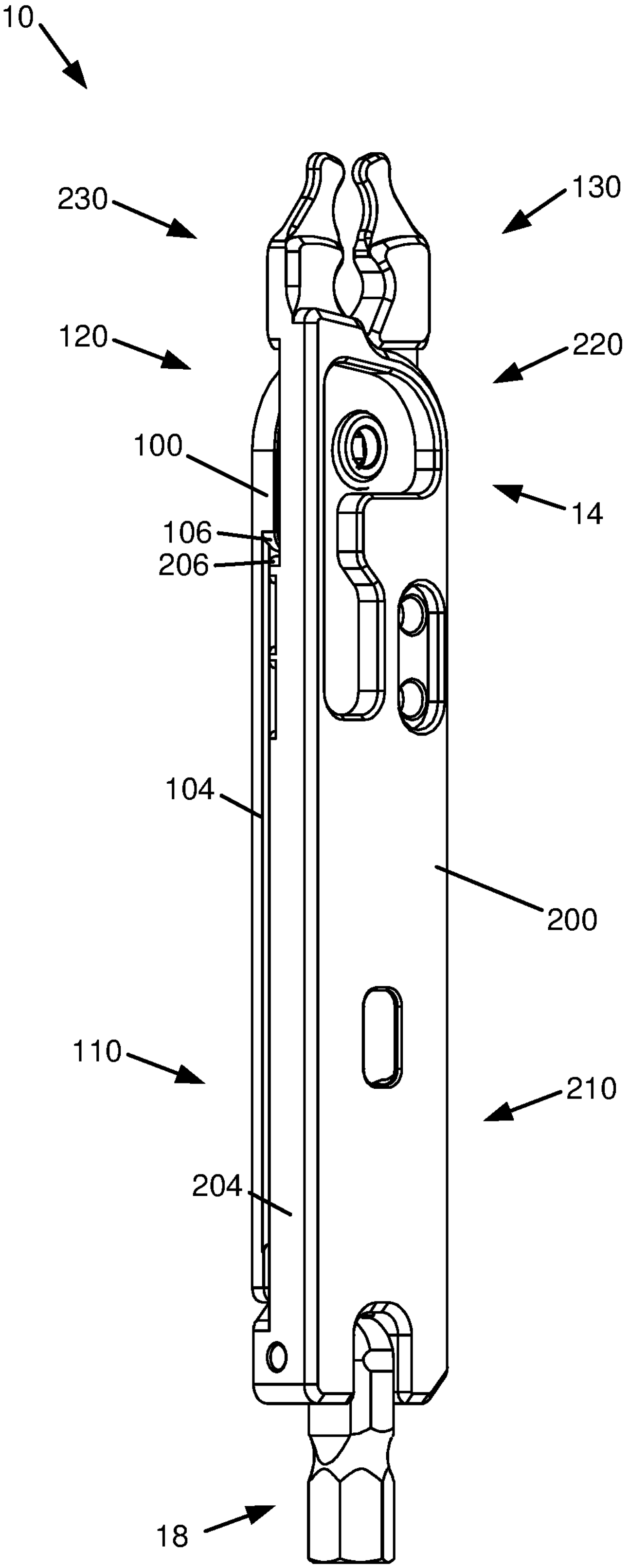
Figure 12:
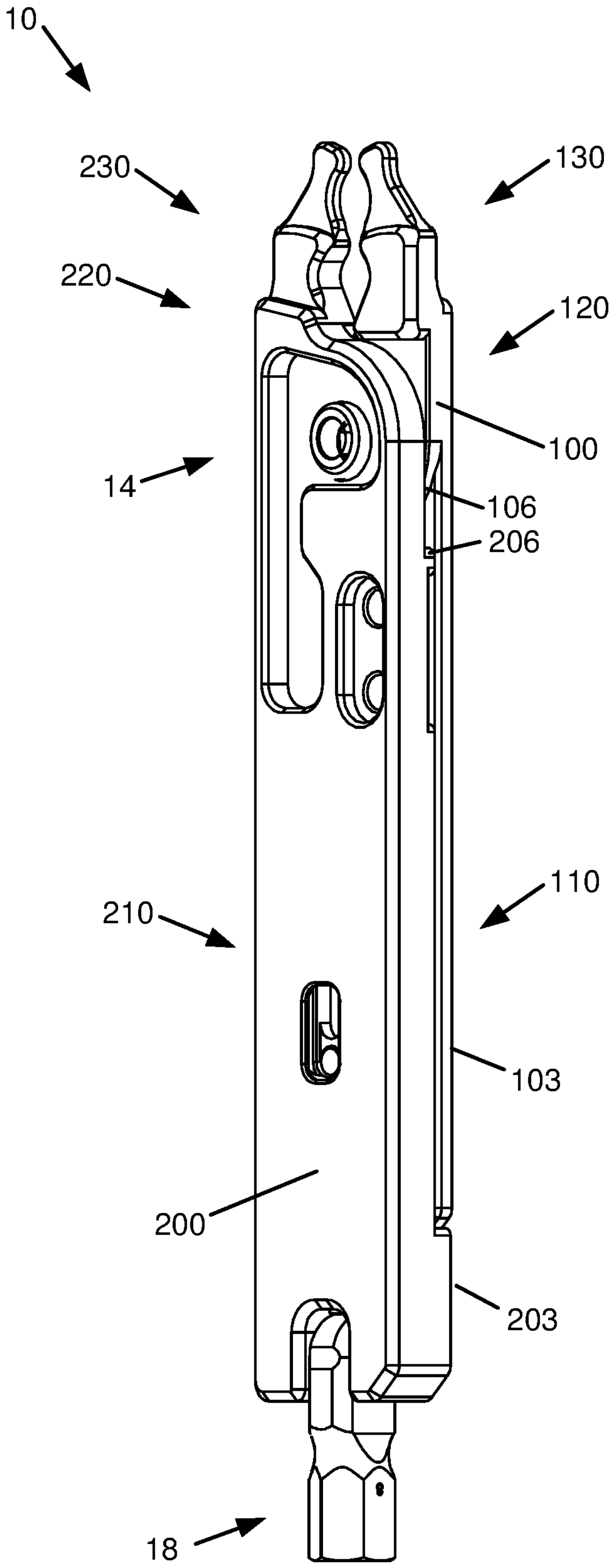
Figure 13:
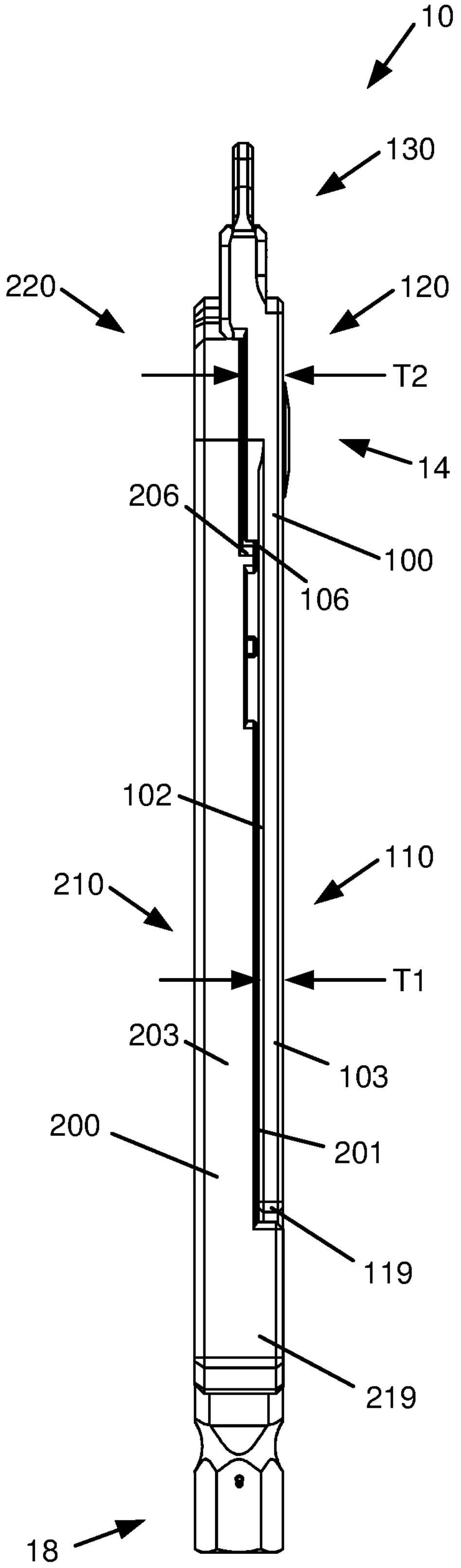
FIGS. 13 and 14 are side views of the multi-tool of FIGS. 1 and 2 in a closed position.
Figure 14:
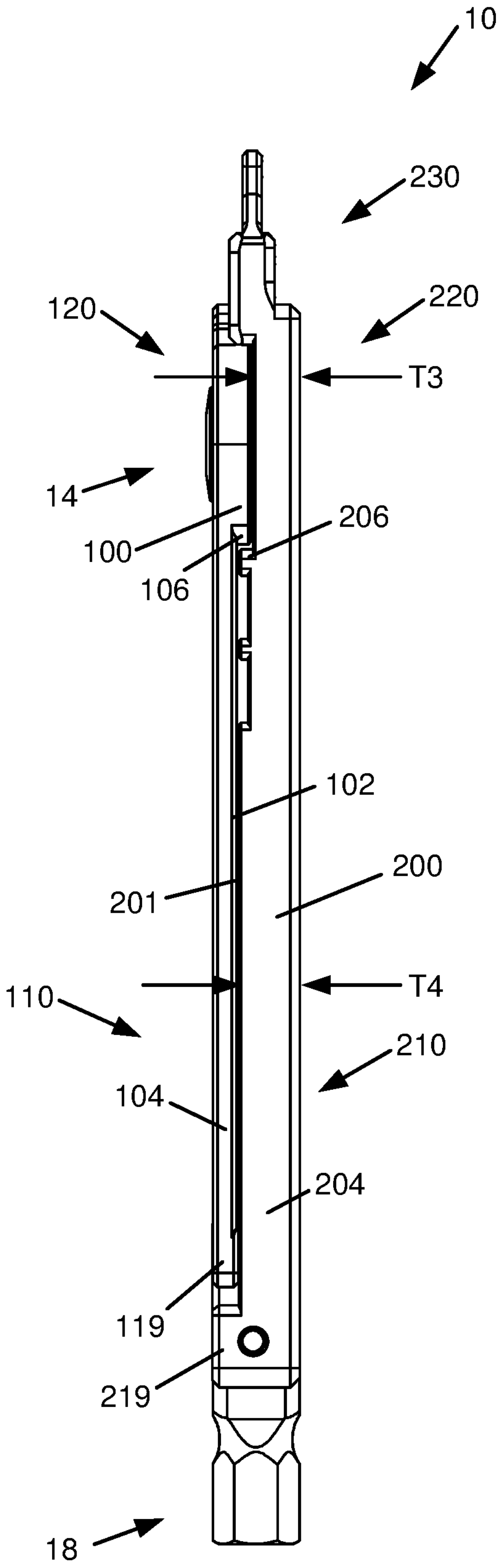

FIGS. 7 and 8, 9 are front and front perspective views, respectively, of multi-tool 10 in a closed position, and FIGS. 10 and 11, 12 are rear and rear perspective views, respectively, of multi-tool 10 in a closed position. In addition, FIGS. 13 and 14 are side views of multi-tool 10 in a closed position.

In the illustrated example, in the closed position, plates 100 and 200 nest or overlap with each other. More specifically, in the closed position, edges 103 and 203 and edges 104 and 204 of respective plates 100 and 200, as extended along respective handle portions 110 and 210 and extended along respective joint portions 120 and 220, are substantially aligned with each other.

In one implementation, tips 134 and 234 of respective head portions 130 and 230 are oriented at an angle relative to respective plates 100 and 200. More specifically, in one example, axes 139 and 239, extended through ends 135 and 235 of respective tips 134 and 234, are oriented at respective angles A1 and A2 relative to edges 103 and 204 of respective plates 100 and 200.

In one implementation, plates 100 and 200 are pivotally coupled at joint 14 such that joint portions 120 and 220 overlap with each other. More specifically, in one example, shoulders 106 and 206 are correspondingly positioned on sides 102 and 201 of respective plates 100 and 200, and plates 100 and 200 are pivotally coupled, such that, in a closed position of multi-tool 10, joint portions 120 and 220 nest with each other.

In the illustrated example, in the closed position, plate 200 extends beyond plate 100. More specifically, end 219 of handle portion 210 of plate 200 extends beyond an end 119 of handle portion 110 of plate 100. As such, in one example, in the closed position, bit holder 18 extends beyond end 119 of plate 100.

Figure 15:
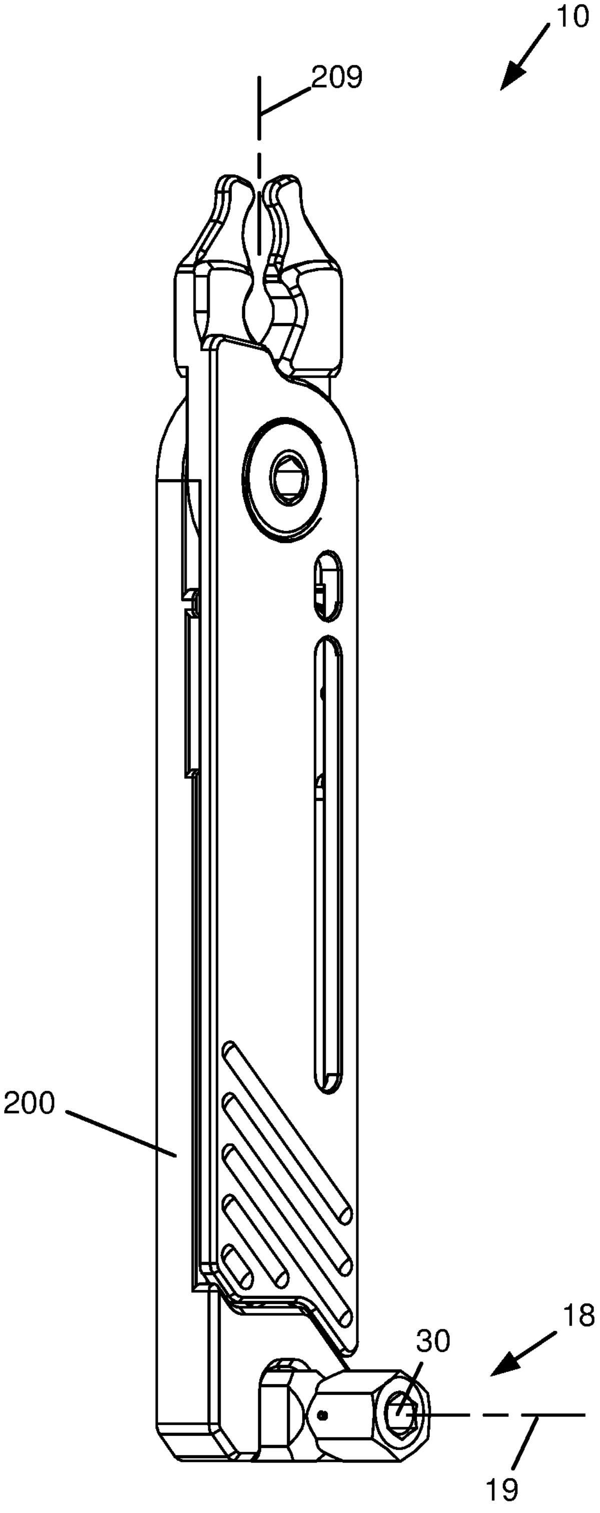
FIGS. 15 and 16 are front perspective views of the multi-tool of FIGS. 1 and 2, with the bit holder of the multi-tool in different positions.
Figure 16:
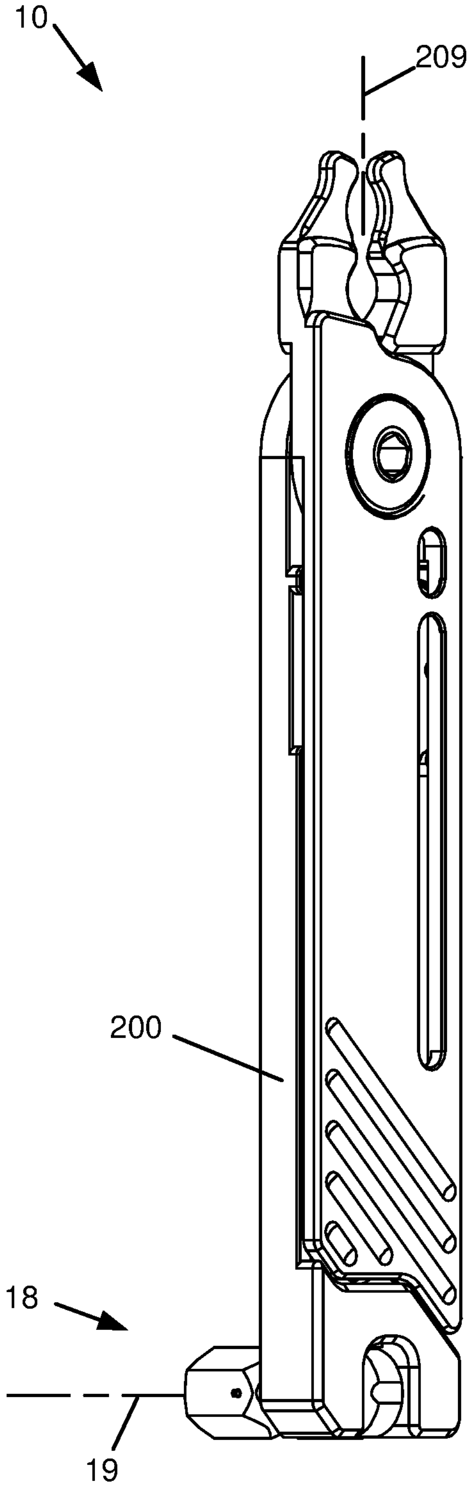

FIGS. 15 and 16 are front perspective views of multi-tool 10, with bit holder 18 in different positions. In examples, bit holder 18 may be swiveled, pivoted or rotated between a first position (as illustrated, for example, in FIG. 8) and one or more than one second position (as illustrated, for example, in FIGS. 15, 16). More specifically, in one implementation, bit holder 18 may be swiveled, pivoted or rotated in two directions (for example, to the left and to the right) to establish two second positions of bit holder 18. In examples, the first position of bit holder 18 represents a neutral position of bit holder 18. In examples, the first position and the second position(s) of bit holder 18 represent operable positions of bit holder 18, as disclosed herein.

In one example, in the first position, bit holder 18 is aligned with plate 200 such that an axis 19 of bit holder 18 is parallel (substantially) with an axis 209 of plate 200. In examples, in the second position, bit holder 18 is oriented at an angle to plate 200 such that axis 19 of bit holder 18 is oriented at an angle to axis 209 of plate 200. As illustrated in the examples of FIGS. 15, 16, bit holder 18 is oriented at an angle to plate 200 such that axis 19 of bit holder 18 is perpendicular (substantially) to axis 209 of plate 200.

Figure 17:
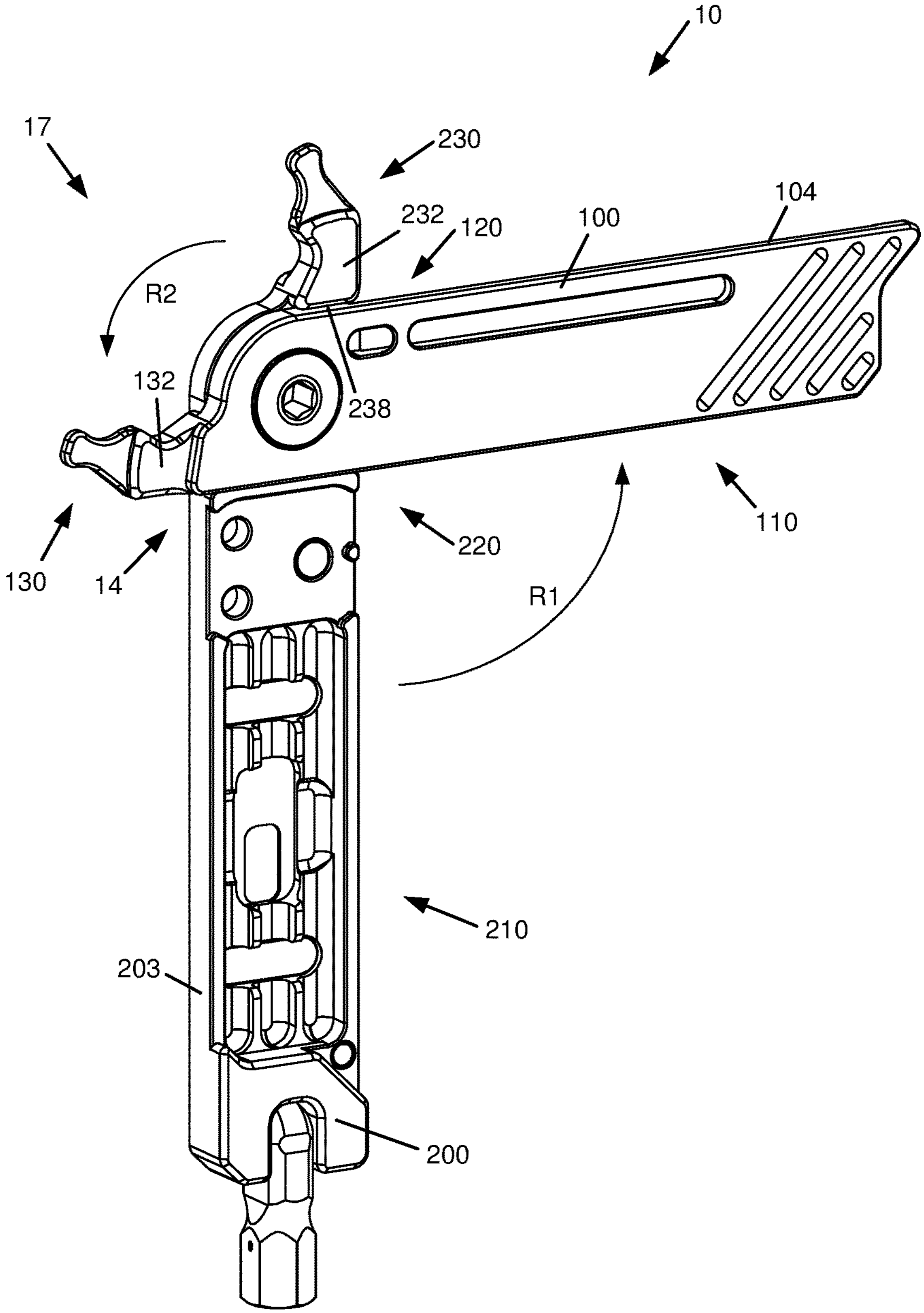
FIGS. 17 and 18 are front and rear perspective views, respectively, of the multi-tool of FIGS. 1 and 2 in an open position.
Figure 18:
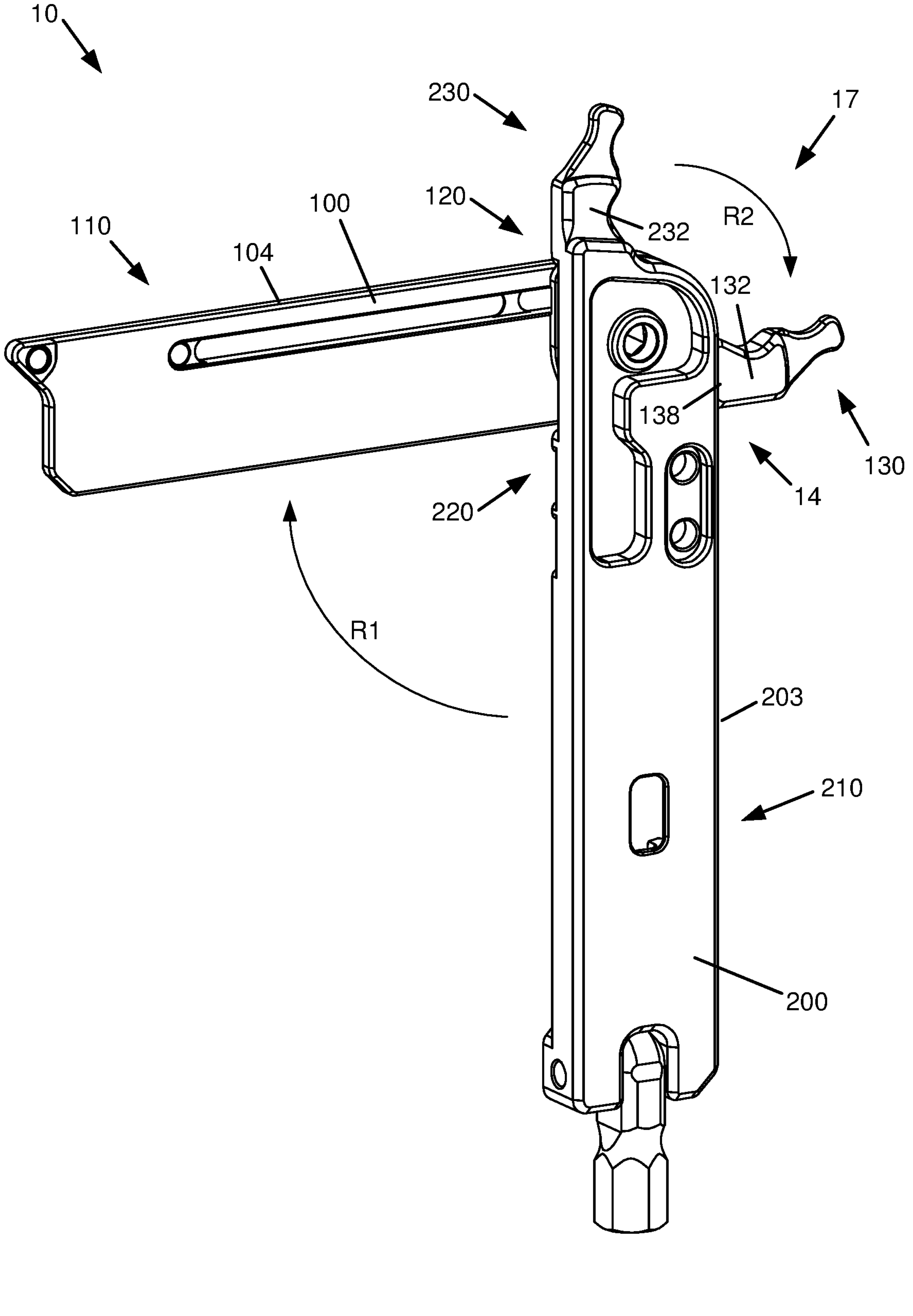

FIGS. 17 and 18 are front and rear perspective views, respectively, of multi-tool 10 in an open position. In the illustrated example, from a closed position (e.g., FIG. 7, 8) to an open position (e.g., FIG. 17, 18), handle portion 110 of plate 100 is rotated or pivoted relative to handle portion 210 of plate 200 about joint 14. More specifically, handle portion 110 of plate 100 is pivoted, for example, away from handle portion 210 of plate 200, as represented by arrow R1. As such, jaw section 132 of head portion 130 is pivoted relative to jaw section 232 of head portion 230. More specifically, jaw section 132 of head portion 130 is pivoted, for example, away from jaw section 232 of head portion 230, as represented by arrow R2. Thus, in the illustrated example, gripping jaws 17 are in an example of an open position. In an open position, gripping jaws 17 may be used to grip or hold an object, for example, a bolt, nut, or other object.

In the illustrated example, handle portion 110 of plate 100 is pivoted relative to handle portion 210 of plate 200 by approximately 90 degrees of rotation. As such, jaw section 132 of head portion 130 is pivoted relative to jaw section 232 of head portion 230, by approximately 90 degrees of rotation. In other examples, handle portion 110 of plate 100 may be pivoted relative to handle portion 210 of plate 200 by other degrees of rotation including, for example, degrees of rotation between approximately 0 degrees and approximately 90 degrees. In addition, in examples, handle portion 110 of plate 100 may be pivoted relative to handle portion 210 of plate 200 by greater than 90 degrees of rotation. Although handle portion 110 of plate 100 is illustrated as being pivoted relative to handle portion 210 of plate 200, handle portion 210 of plate 200 may be pivoted relative to handle portion 110 of plate 100, or handle portion 110 of plate 100 and handle portion 210 of plate 200 may both be pivoted relative to each other.

In one implementation, shoulders 138 and 238 of respective head portions 130 and 230 provide stops to limit pivoting or rotation of plates 100 and 200 relative to each other. For example, in the illustrated example, edge 104 of plate 100 engages or contacts shoulder 238 of plate 200 and/or edge 203 of plate 200 engages or contacts shoulder 138 of plate 100 such that rotation of plates 100 and 200 relative to each other is limited or stopped.

Figure 19:
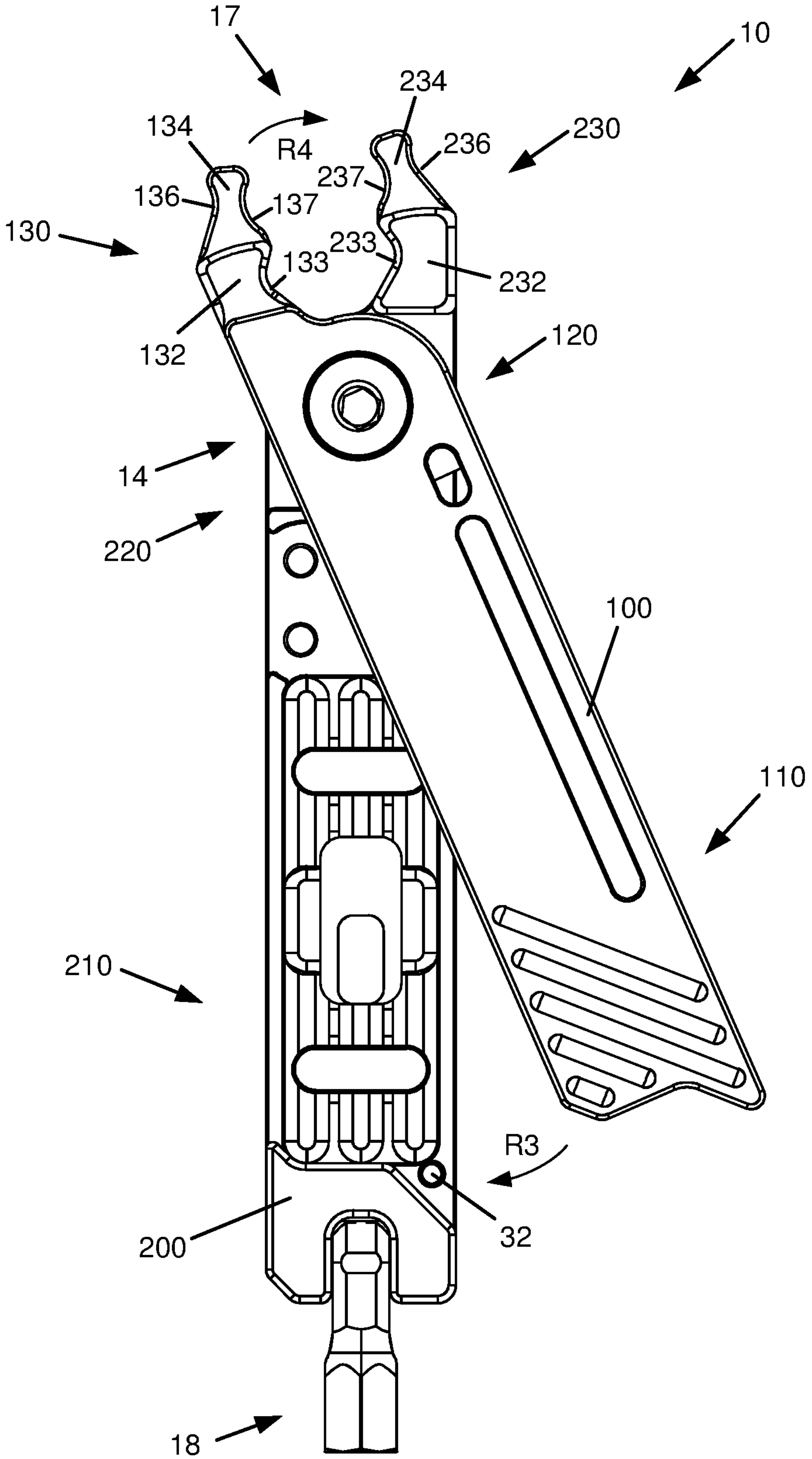
FIG. 19 is a front view of the multi-tool of FIGS. 1 and 2 in an example of a position between the open position of FIG. 17 and the closed position of FIG. 7.

FIG. 19 is a front view of multi-tool 10 in an example of a position between the open position of FIG. 17 and the closed position of FIG. 7. In the illustrated example, from the open position of FIG. 17, handle portion 110 of plate 100 is pivoted relative to handle portion 210 of plate 200, for example, toward handle portion 210 of plate 200, as represented by arrow R3. As such, jaw section 132 of head portion 130 of plate 100 is pivoted relative to jaw section 232 of the head portion 230 of plate 200, for example, toward jaw section 232, as represented by arrow R4. Thus, in the illustrated example, gripping jaws 17 are in another example of an open position. As such, gripping jaws 17 may be used to grip or hold an object, for example, a bolt, nut or other object.

In one example, as handle portion 110 of plate 100 and handle portion 210 of plate 200 are brought into proximity of each other, for example, as handle portion 110 of plate 100 is pivoted relative to handle portion 210 of plate 200 and toward the closed position of FIG. 7, magnetic elements 31 (see, e.g., FIG. 18) and 32 interact or attract each other to magnetically "pull" handle portion 110 of plate 100 to the closed position of FIG. 7. As such, in one example, magnetic elements 31 and 32 provide a magnetic closure and magnetically couple handle portions 110 and 210 of respective plates 100 and 200. In one example, magnetic elements 31 and 32 help to maintain the closed position of multi-tool 10 until an open position of multi-tool 10 is initiated (e.g., until handle portion 110 of plate 100 is pivoted or rotated away from handle portion 210 of plate 200, as illustrated, for example, in FIG. 17).

Figure 20A:
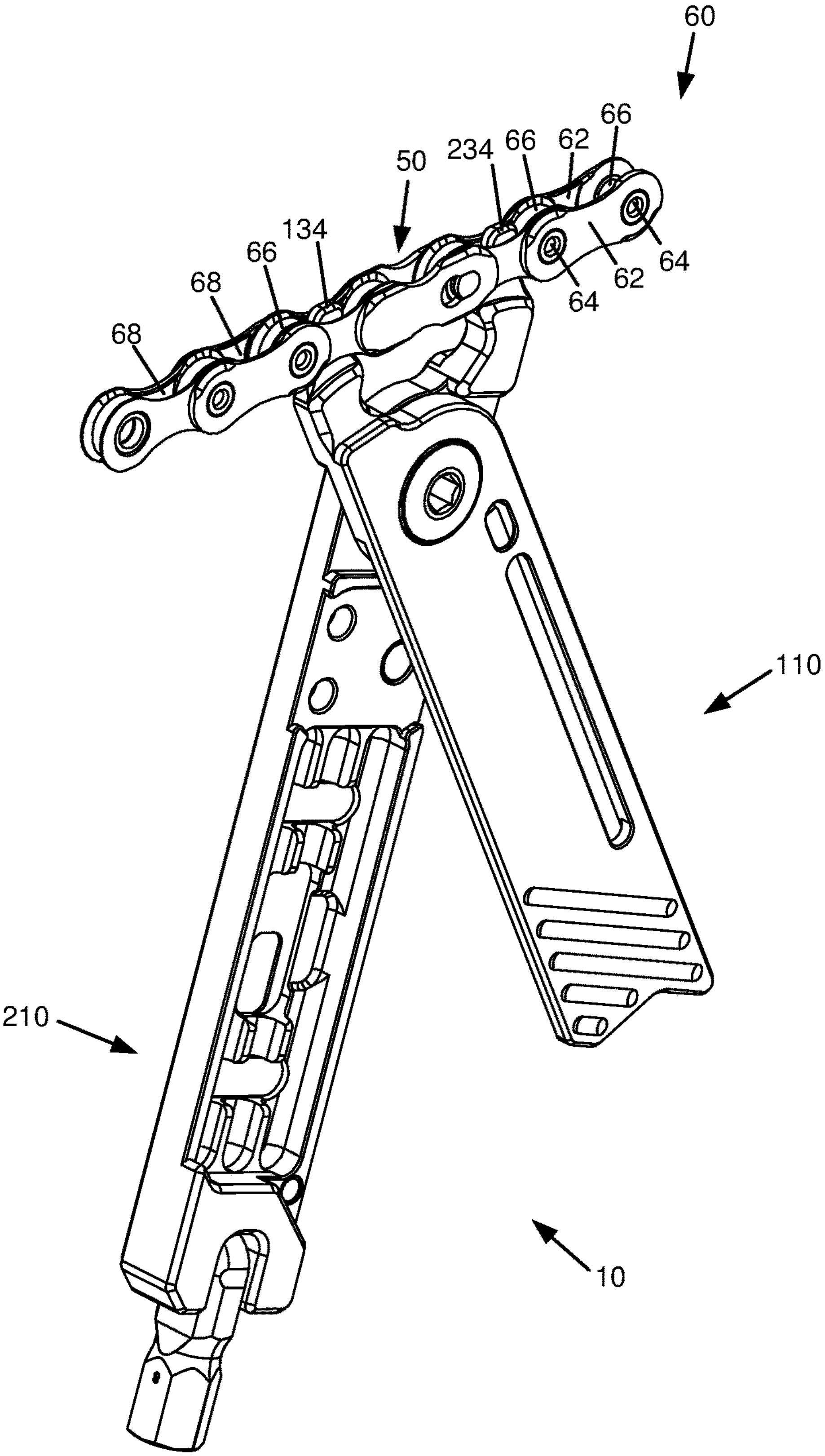
FIGS. 20A, 20B, 20C are front perspective views illustrating an example of use of the multi-tool of FIGS. 1 and 2.
Figure 20B:
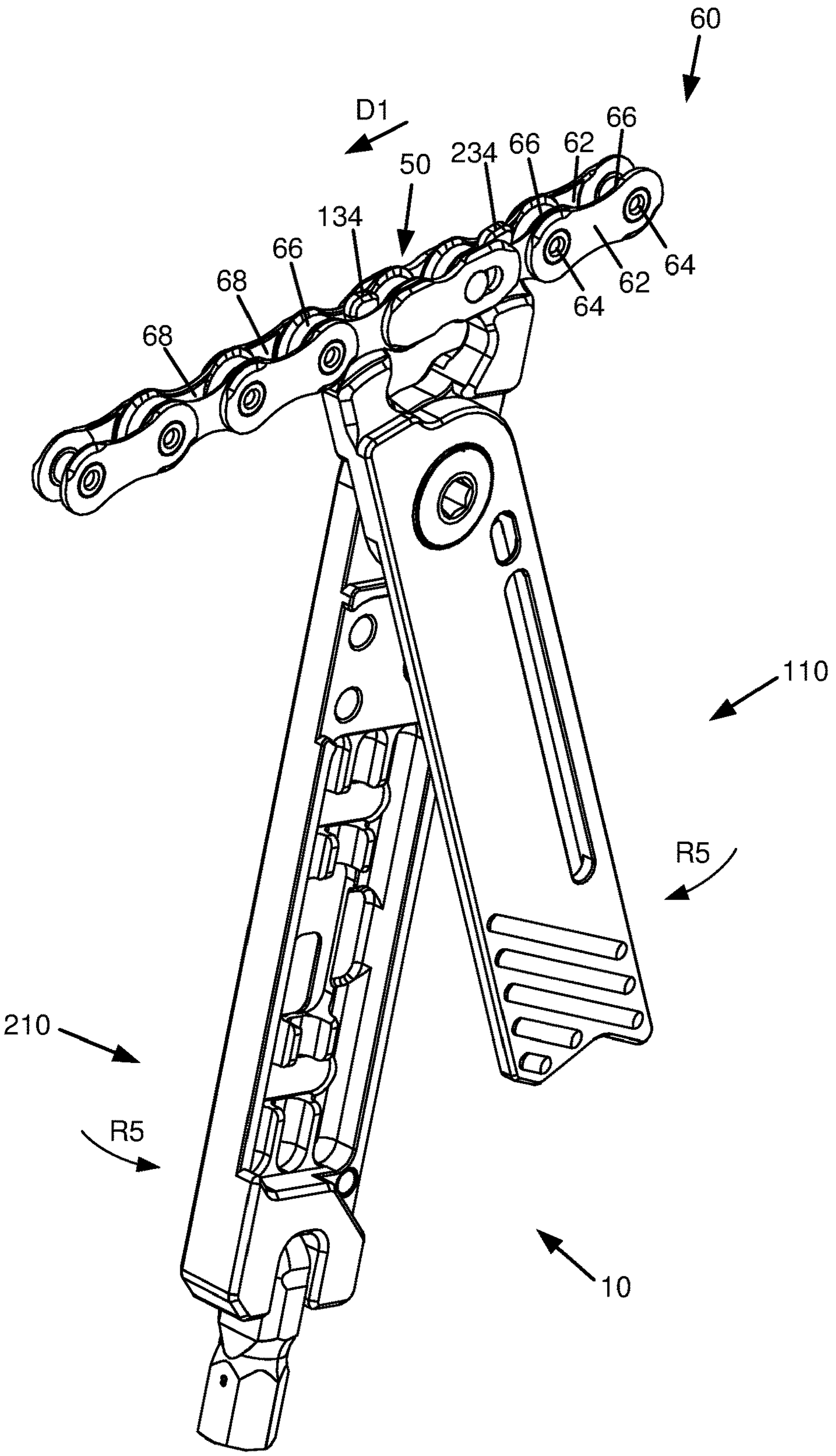
Figure 20C:
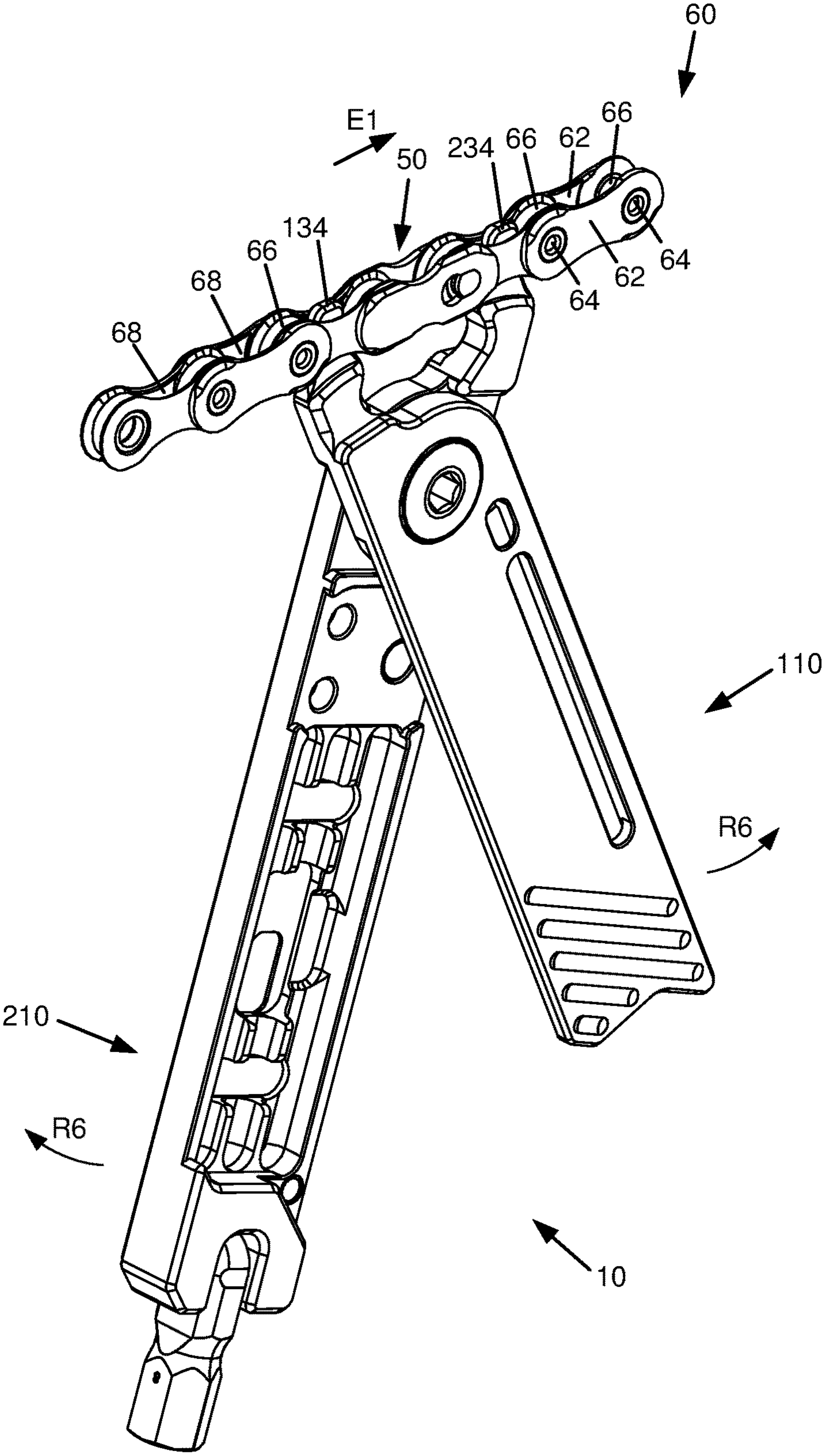

FIGS. 20A, 20B, 20C are front perspective views, respectively, illustrating an example of use of multi-tool 10. For example, multi-tool 10 may be used to disengage and/or engage or remove and/or install a chain link 50 of a roller chain 60, such as a master link for a roller chain of a bicycle, including, for example, a Quick-Link by Shimano. In one example, chain link 50 may be used to join or couple two ends of roller chain 60 so as to form an endless or continuous loop of roller chain 60.

In the illustrated example, roller chain 60 includes and/or is formed by alternating, overlapping pairs of laterally spaced link plates 62. In one example, alternating, overlapping pairs of spaced link plates 62 are pivotally interconnected by link pins 64 extended through cylindrical rollers 66 provided between spaced link plates 62 at overlapping, opposite ends of spaced link plates 62. As such, laterally spaced link plates 62 form alternating teeth receiving openings 68.

As illustrated in the example of FIG. 20A, tips 134 and 234 of multi-tool 10 engage a section of roller chain 60. More specifically, tips 134 and 234 of multi-tool 10 engage teeth receiving openings 68 formed by spaced link plates 62 of roller chain 60 at opposite ends of chain link 50.

As such, as illustrated in the example of FIG. 20B, handle portions 110 and 210 are pivoted toward each other (e.g., squeezed together), as represented by arrows R5, to disengage chain link 50, as represented by arrow D1. More specifically, engaging surfaces 137 and 237 (see, e.g., FIG. 19) of respective tips 134 and 234 engage chain link 50 and slide link pins of chain link 50 within link pin slots formed in respective link plates of chain link 50. As such, chain link 50 may be released and/or removed from roller chain 60.

As illustrated in the example of FIG. 20C, handle portions 110 and 210 are pivoted away from each other (e.g., pulled apart), as represented by arrows R6 to engage (or install) chain link 50, as represented by arrow E1. More specifically, engaging surfaces 136 and 236 (see, e.g., FIG. 19) of respective tips 134 and 234 engage cylindrical rollers 66 at opposite ends of chain link 50 and slide link pins of chain link 50 within link pin slots formed in respective link plates of chain link 50. As such, chain link 50 is installed on roller chain 60.

FIGS. 21A, 21B and FIGS. 22A, 22B are front and rear perspective views, respectively, illustrating an example of use of multi-tool 10. For example, multi-tool 10 may be used to store a rasp, may be used to store one or more than one chain link, may be used to store one or more than one insert bit, and/or may be used to store a wrench. More specifically, in examples, storage area 140 of handle portion 110 may be used to store a rasp 40, storage area 240 of handle portion 210 may be used to store a chain link for a roller chain, such as, for example, chain link 50, storage area 250 of handle portion 210 may be used to store a plurality of insert bits 70, and storage area 260 of handle portion 210 may be used to store a combination spoke wrench and valve core wrench 80.

As illustrated in the example of FIGS. 21A and 21B and FIGS. 22A and 22B, rasp 40 is fit within recessed region 142 such that one end of rasp 40 fits within pocket 146 (with crossbar 148 providing support for rasp 40 near or adjacent the one end), and an opposite end of rasp 40 is held by magnetic element 33 such that rasp 40 is stored within storage area 140. In one implementation, rasp 40 is inserted into pocket 146 and positioned within recessed region 142 from side 102 of plate 100. In one implementation, rasp 40 may be removed from recessed region 142 by contacting rasp 40 though slot 144 from side 101 of plate 100 and pushing rasp 40 out of recessed region 142 away from side 102.

In one example, chain link 50 includes a pair of corresponding link plates 51 and 52 having respective link pins 53 and 54 extending therefrom. As such, link pins 53 and 54 engage corresponding link pin slots 56 and 55 formed in respective link plates 52 and 51 to assemble chain link 50. In examples, recessed region 242 of storage area 240 is sized and shaped to receive link plates 51 and 52 of chain link 50, and holes 244 of storage area 240 are sized and positioned to receive link pins 53 and 54 extended from respective link plates 51 and 52.

Figure 21A:
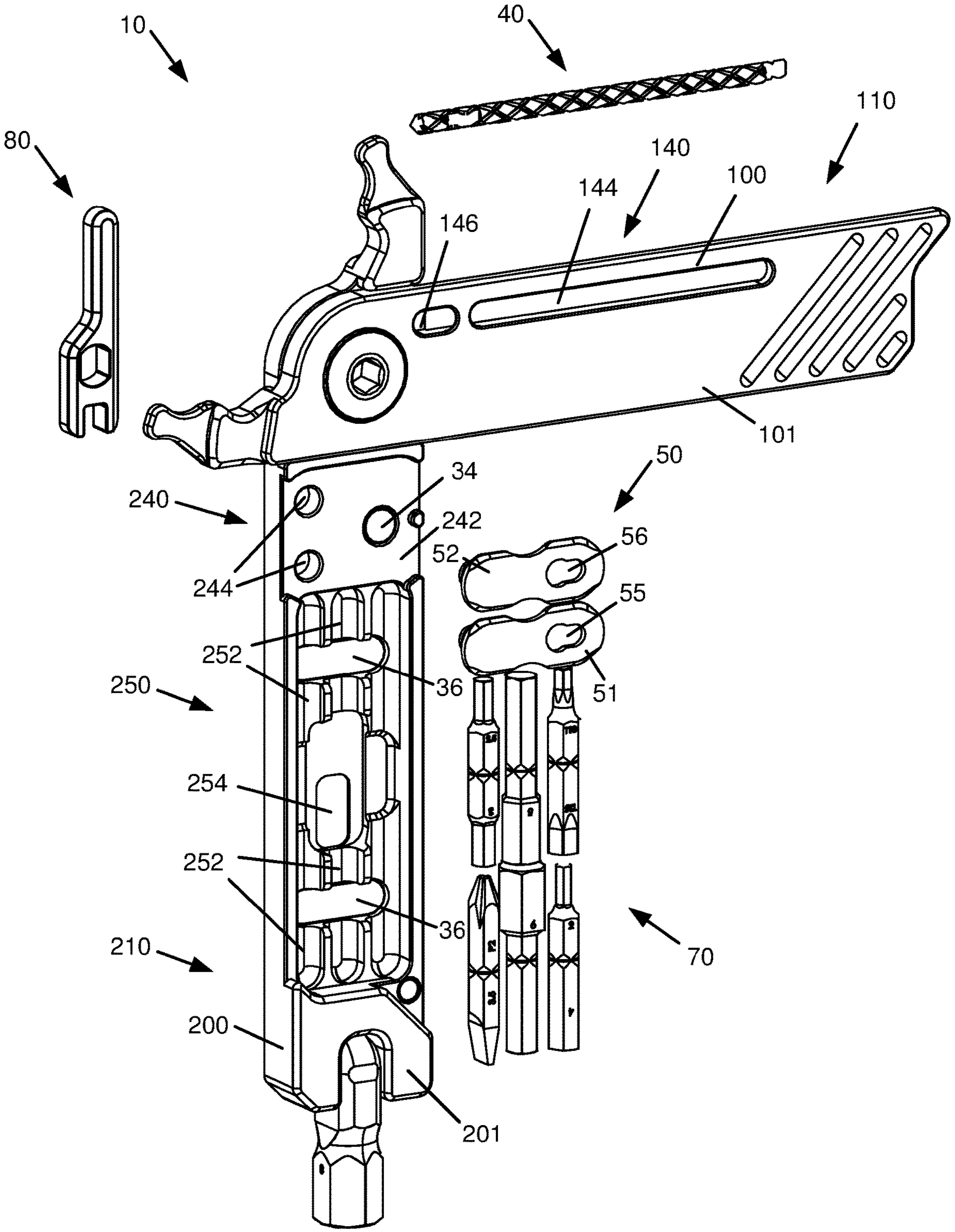
FIGS. 21A, 21B and FIGS. 22A, 22B are front and rear perspective views, respectively, illustrating an example of use of the multi-tool of FIGS. 1 and 2.
Figure 21B:
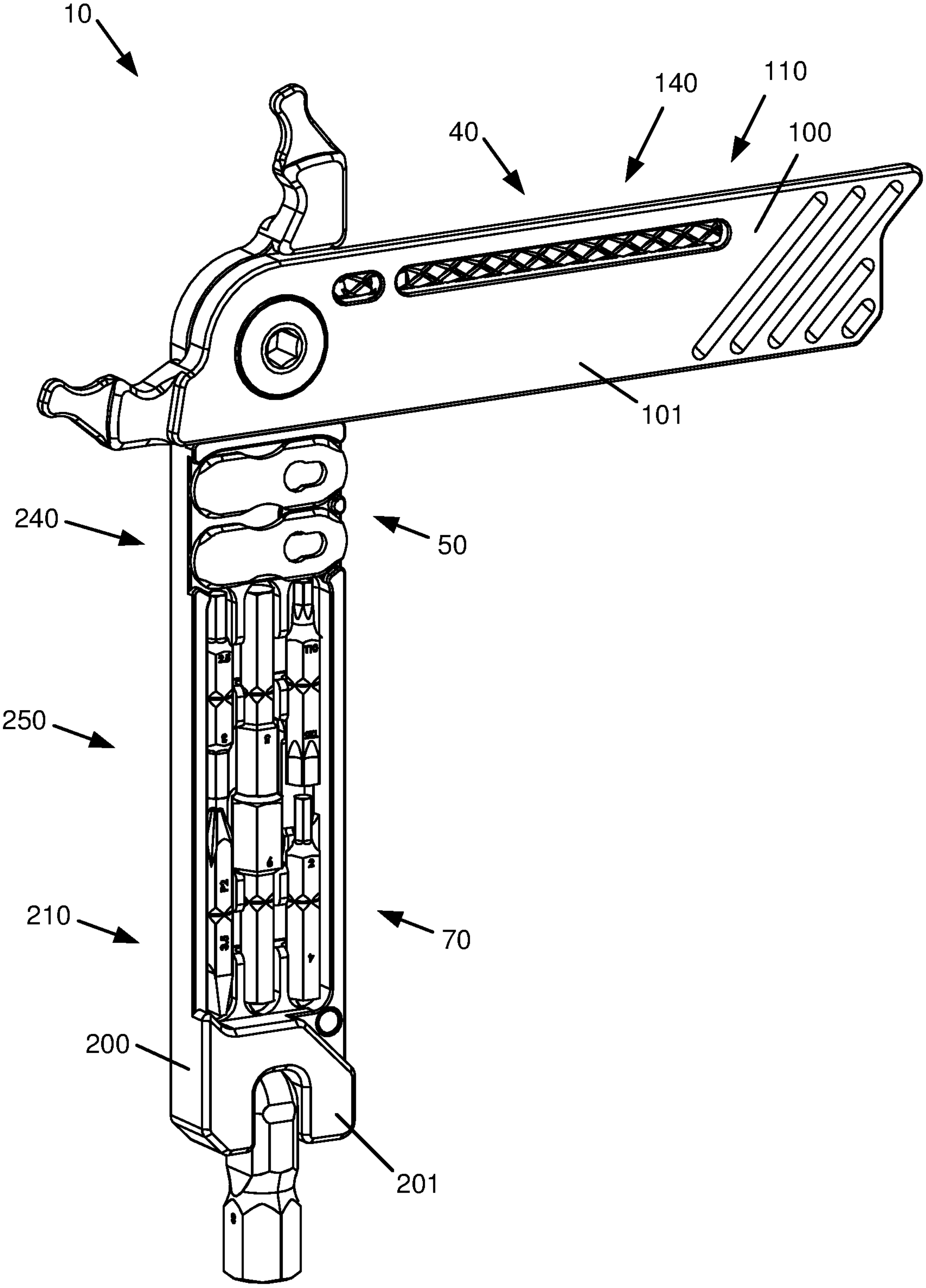

As illustrated in the example of FIGS. 21A and 21B, link plates 51 and 52 fit within recessed region 242 of storage area 240. In addition, as illustrated in the example of FIGS.

22A and 22B, link pins 53 and 54 of respective link plates 51 and 52 engage and/or fit within respective holes 244 of storage area 240. As such, link plates 51 and 52 of chain link 50 are stored within storage area 240.

In one implementation, magnetic element 34 is positioned within recessed region 242 of storage area 240 such that link plates 51 and 52 each overlap at least a portion of magnetic element 34 when link plates 51 and 52 are positioned within recessed region 242. As such, link plates 51 and 52 are attracted by magnetic element 34 such that magnetic element 34 helps to retain or hold link plates 51 and 52 within recessed region 242 of storage area 240. In addition, in the closed position, plate 100 covers storage area 240 such that plate 100 helps to retain or hold link plates 51 and 52 within recessed region 242 of storage area 240.

Figure 22A:
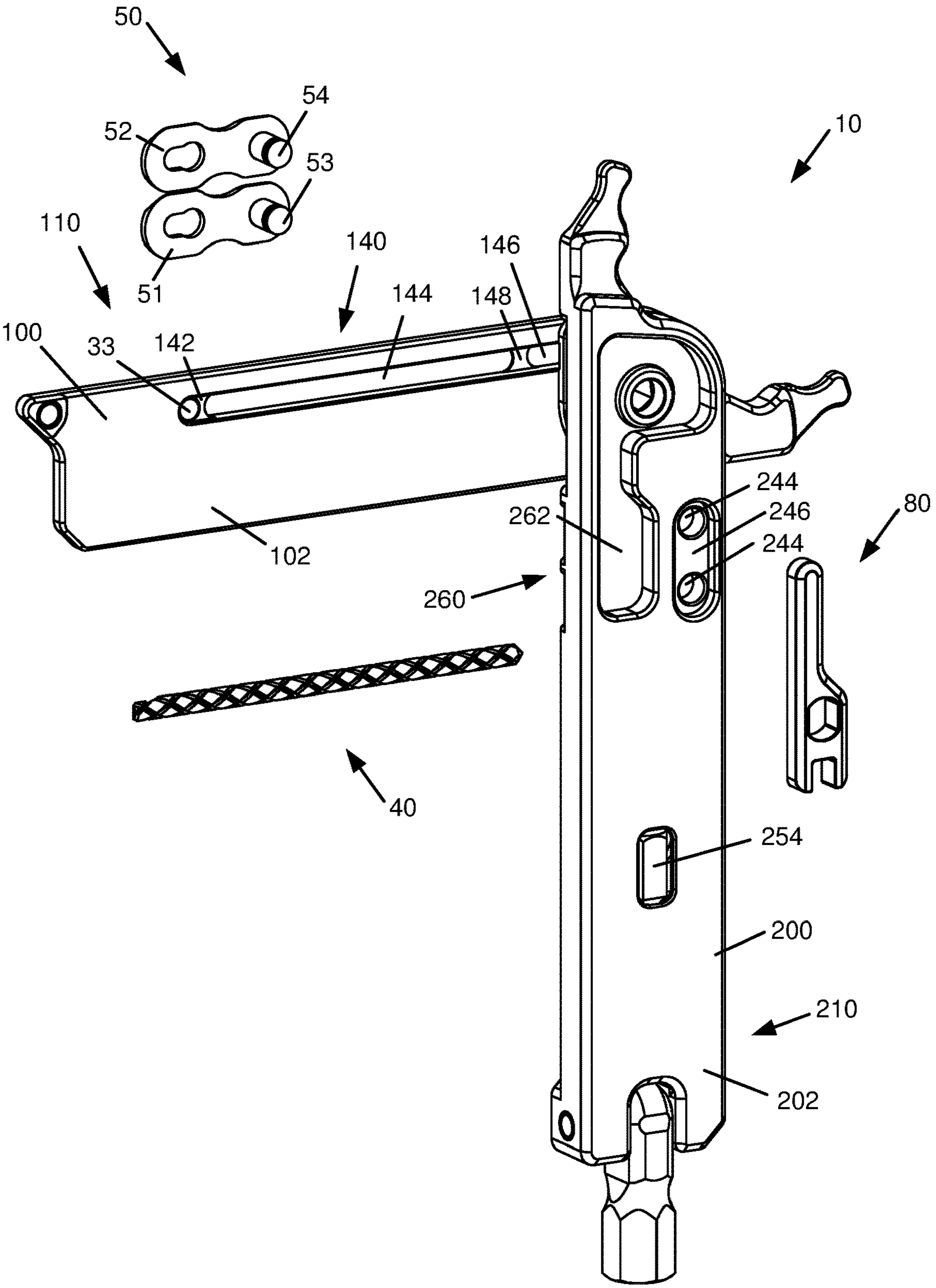
Figure 22B:
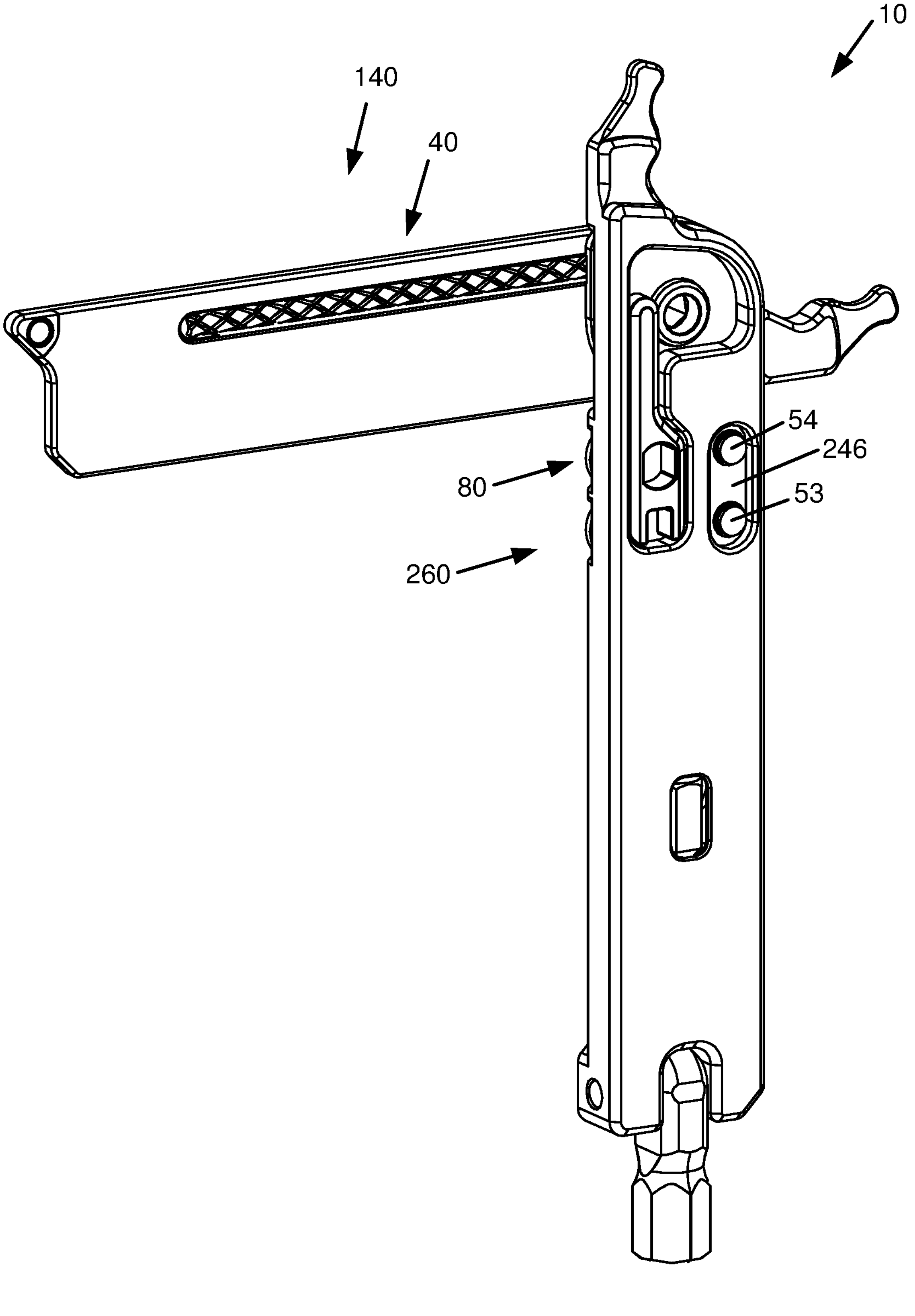

In one implementation, as illustrated in the example of FIGS. 22A and 22B, respective ends of link pins 53 and 54 protrude into or through recess 246 at side 202 of plate 200. As such, recess 246 helps to provide access to link pins 53 and 54 for removal of link plates 51 and 52 from storage area 240, for example, by pressing (pushing) link pins 53 and 54 from side 202 of plate 200. In the illustrated example, two chain links 50 (each including a pair of corresponding link plates 51 and 52 having respective link pins 53 and 54 and respective link pin slots 55 and 56) are stored within storage area 240. The number of chain links stored within storage area 240, however, may vary.

As illustrated in the example of FIGS. 21A and 21B, insert bits 70 are fit within respective cavities or pockets 252 such that insert bits 70 are stored within storage area 250. In one implementation, magnetic elements 36, 36 help to hold or retain insert bits within respective pockets 252 of storage area 250. In addition, in the closed position, plate 100 covers storage area 250 such that plate 100 helps to retain or hold insert bits 70 within pockets 252 of storage area 250. In examples, as disclosed herein, insert bits 70 may be removed from respective pockets 252 by tipping and/or picking insert bits 70 from side 201 of plate 200 and/or pushing or tipping insert bits 70 from side 202 of plate 200. In the illustrated example, six insert bits 70 are stored within pockets 252 of storage area 250. The number of insert bits stored within storage area 240, however, may vary.

As illustrated in the example of FIGS. 22A and 22B, wrench 80 is fit within recessed region 262 such that wrench 80 is stored within storage area 260. In one implementation, magnetic element 34 (as positioned within recessed region 242 of storage area 240 (e.g., FIG. 21A) opposite recessed region 262) helps to retain or hold wrench 80 within recessed region 262 of storage area 260.

Figure 23:
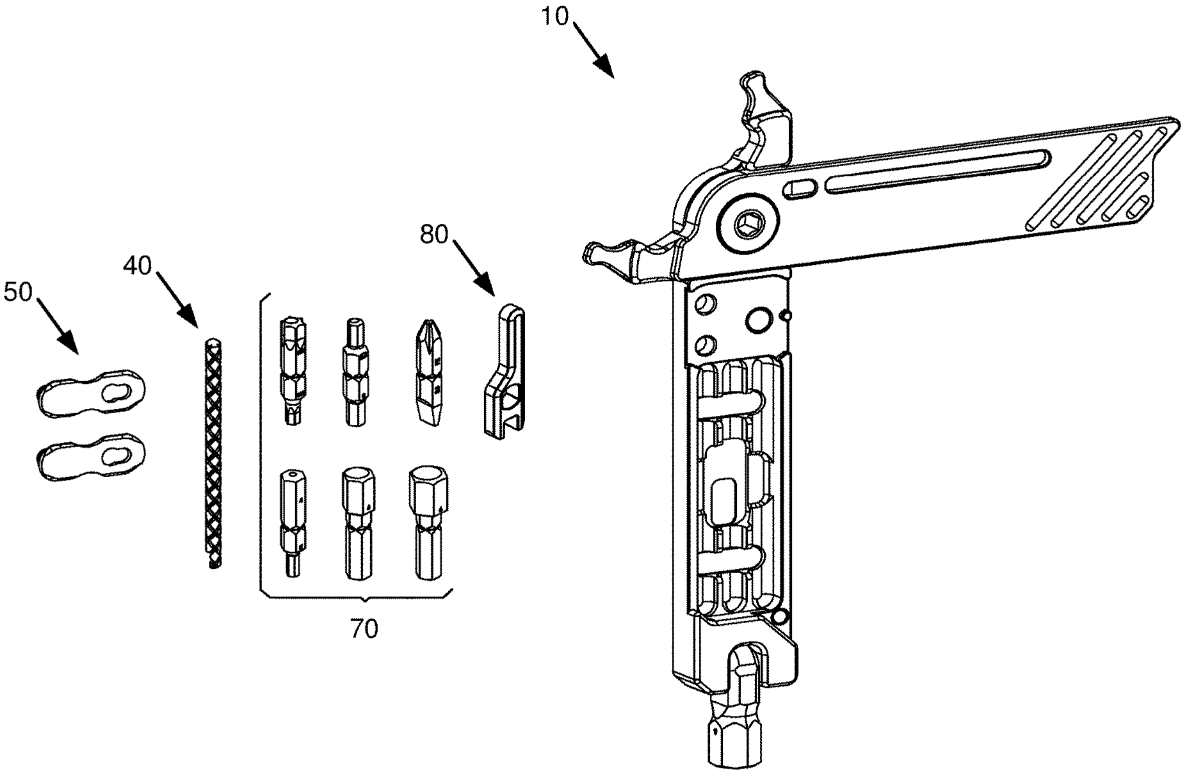
FIG. 23 is a front perspective view of an example of the multi-tool of FIGS. 1 and 2, with a rasp, set of chain links, plurality of insert bits, and a wrench.
Figure 24:
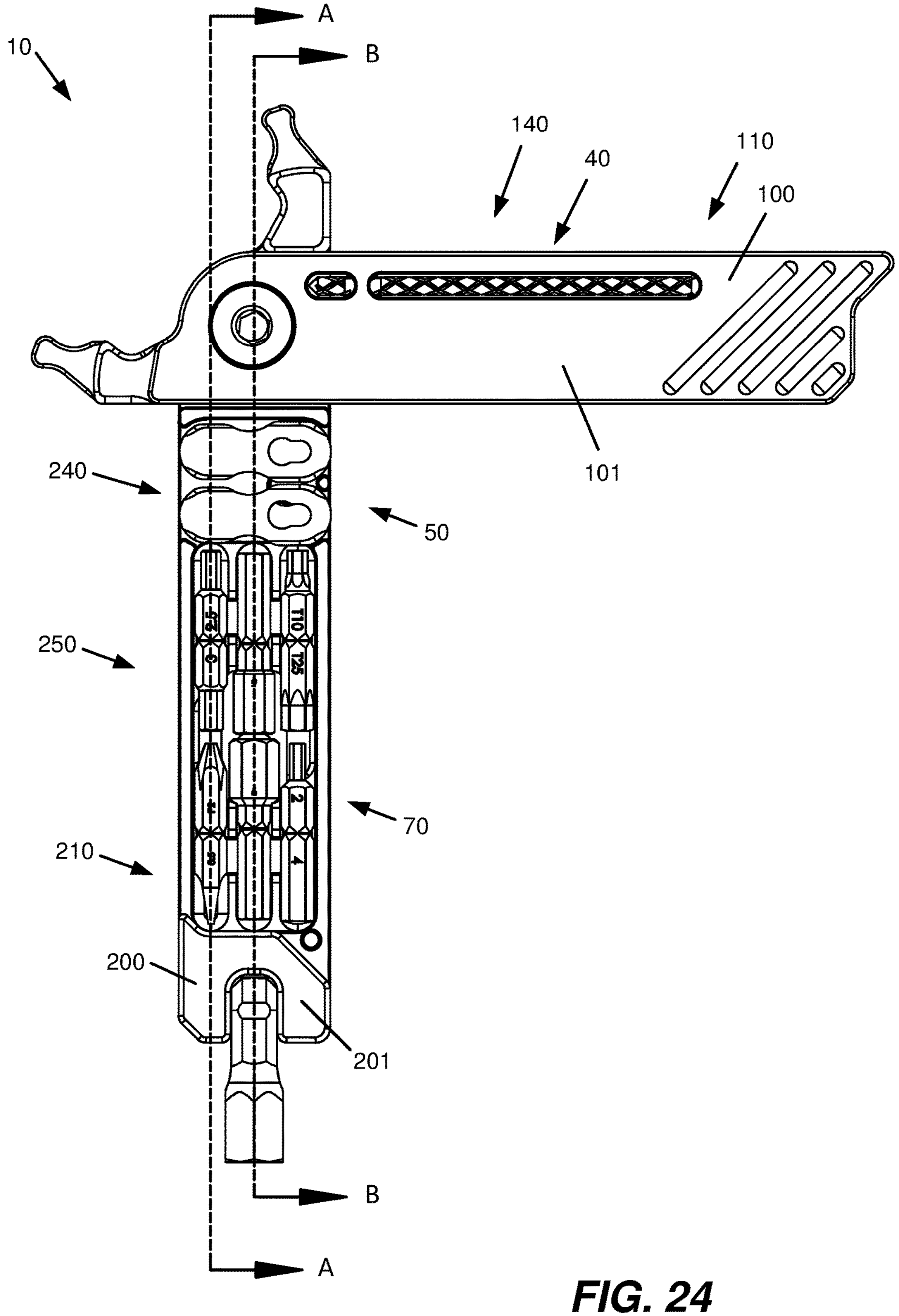
FIG. 24 is a front view illustrating an example of the multi-tool of FIGS. 1 and 2.

Accordingly, as illustrated in the example of FIG. 23, multi-tool 10 provides storage for rasp 40, chain links 50, insert bits 70, and/or wrench 80. In one implementation, insert bits 70 have, for example, the following tips and/or features: Hex: 2 mm, 2.5 mm, 3 mm, 4 mm, 5 mm, 6 mm; Torx® compatible: T10, T25; Flathead #3.5; Phillips #2. In other implementations, insert bits 70 may have other tips and/or features.

Figure 25A:
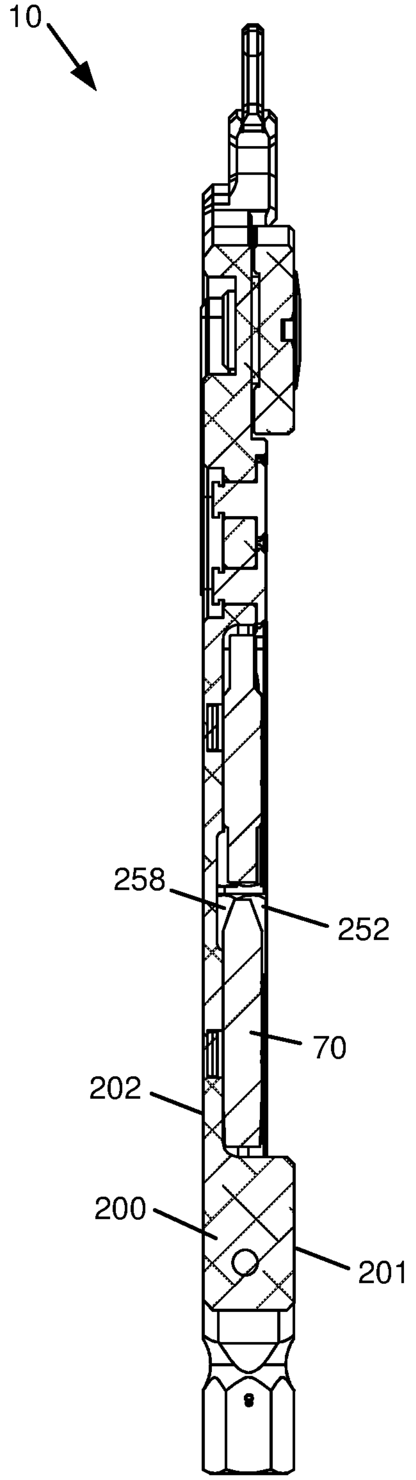
FIGS. 25A, 25B, 25C are cross-sectional views of a portion of the multi-tool of FIGS. 1 and 2 from the perspective of line A-A of FIG. 24.
Figure 25B:
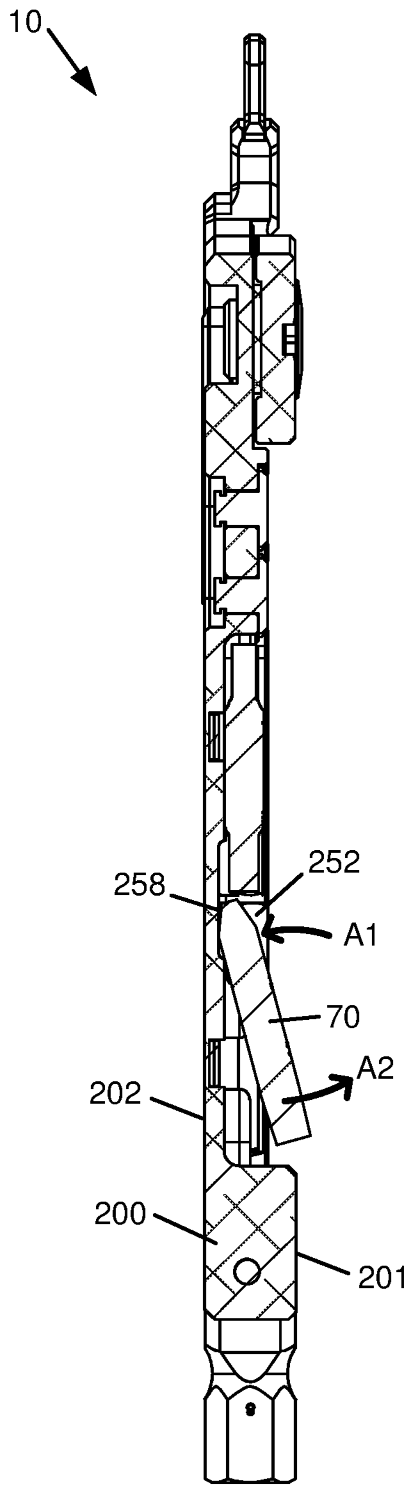
Figure 25C:
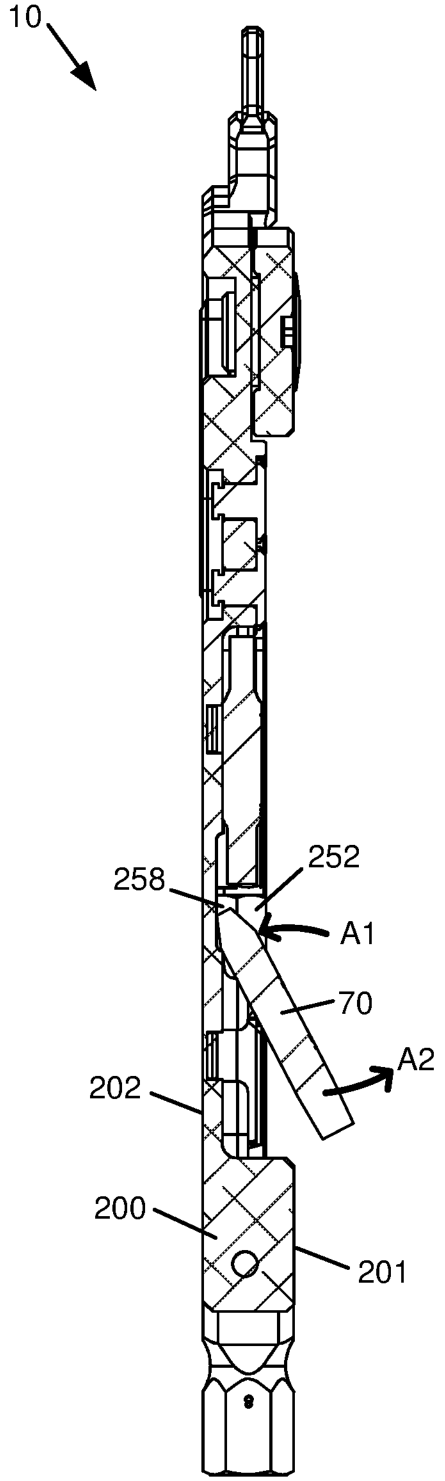

In one implementation, as illustrated, for example, in FIGS. 25A, 25B, and 25C, one or more of pockets 252 may include a recess or depression 258 in a bottom (base or floor) of a respective pocket 252 at (adjacent or near) a first end thereof (see also, e.g., FIGS. 3, 4). As such, as illustrated in the examples of FIGS. 25B, 25C, a first end of a respective insert bit 70 may be pushed into depression 258 (as represented, for example, by arrow A1) to tip an opposite, second end of insert bit 70 away from or out of the respective pocket 252 (as represented, for example, by arrow A2). As such, in examples, insert bit 70 may be more easily removed from a respective pocket 252.

Figure 26A:
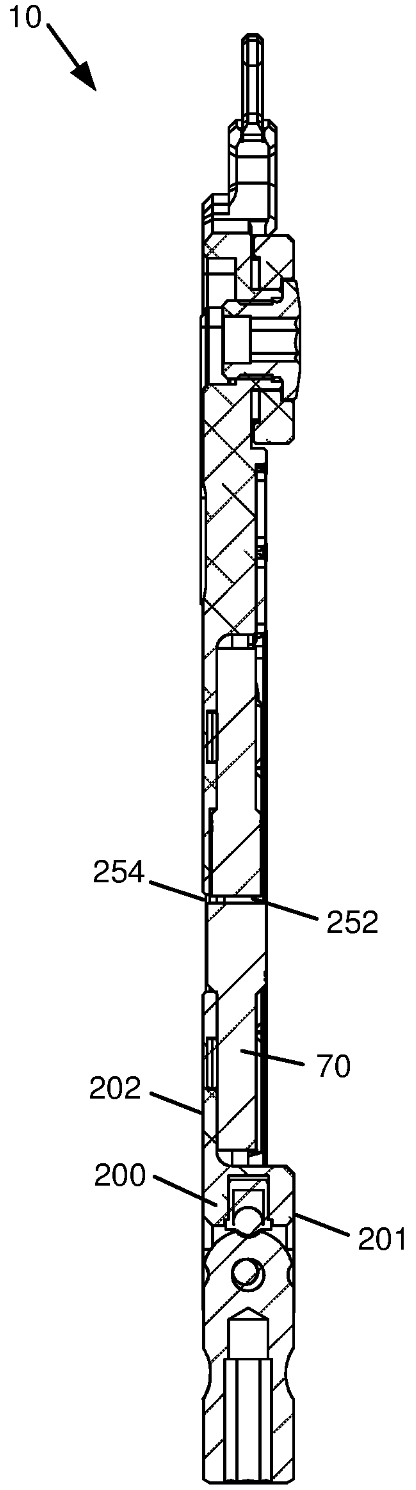
FIGS. 26A, 26B, 26C are cross-sectional views of a portion of the multi-tool of FIGS. 1 and 2 from the perspective of line B-B of FIG. 24.
Figure 26B:
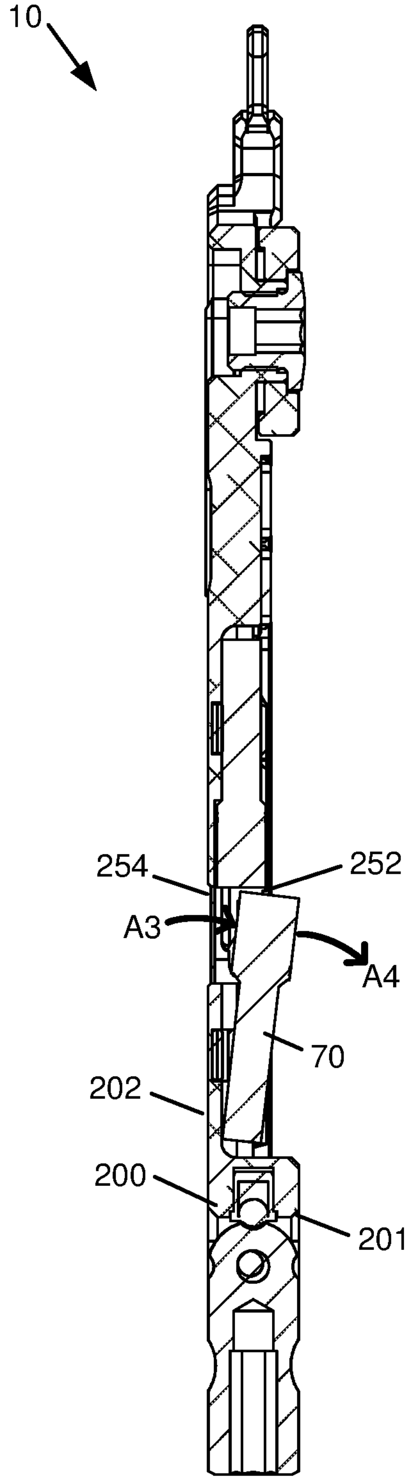
Figure 26C:
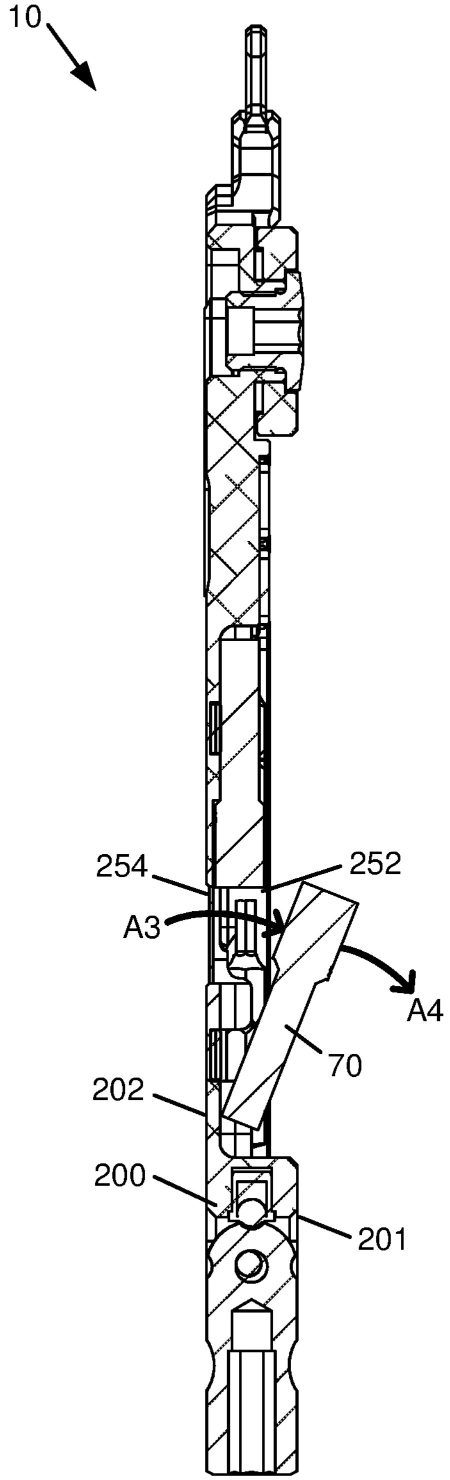

In one implementation, as illustrated, for example, in FIGS. 26A, 26B, 26C, opening 254 of storage area 250 communicates with one or more than one pocket 252 such that an insert bit 70 positioned within the respective pocket 252 may be accessed through opening 254 from side 202 of plate 200. As such, as illustrated in the examples of FIGS. 26B, 26C, a respective insert bit 70 may be pushed out of a respective pocket 252 (as represented, for example, by arrow A3) such that insert bit 70 is tipped away from or out of the respective pocket 252 (as represented, for example, by arrow A4). As such, in examples, insert bit 70 may be more easily removed from a respective pocket 252.

Figure 27:
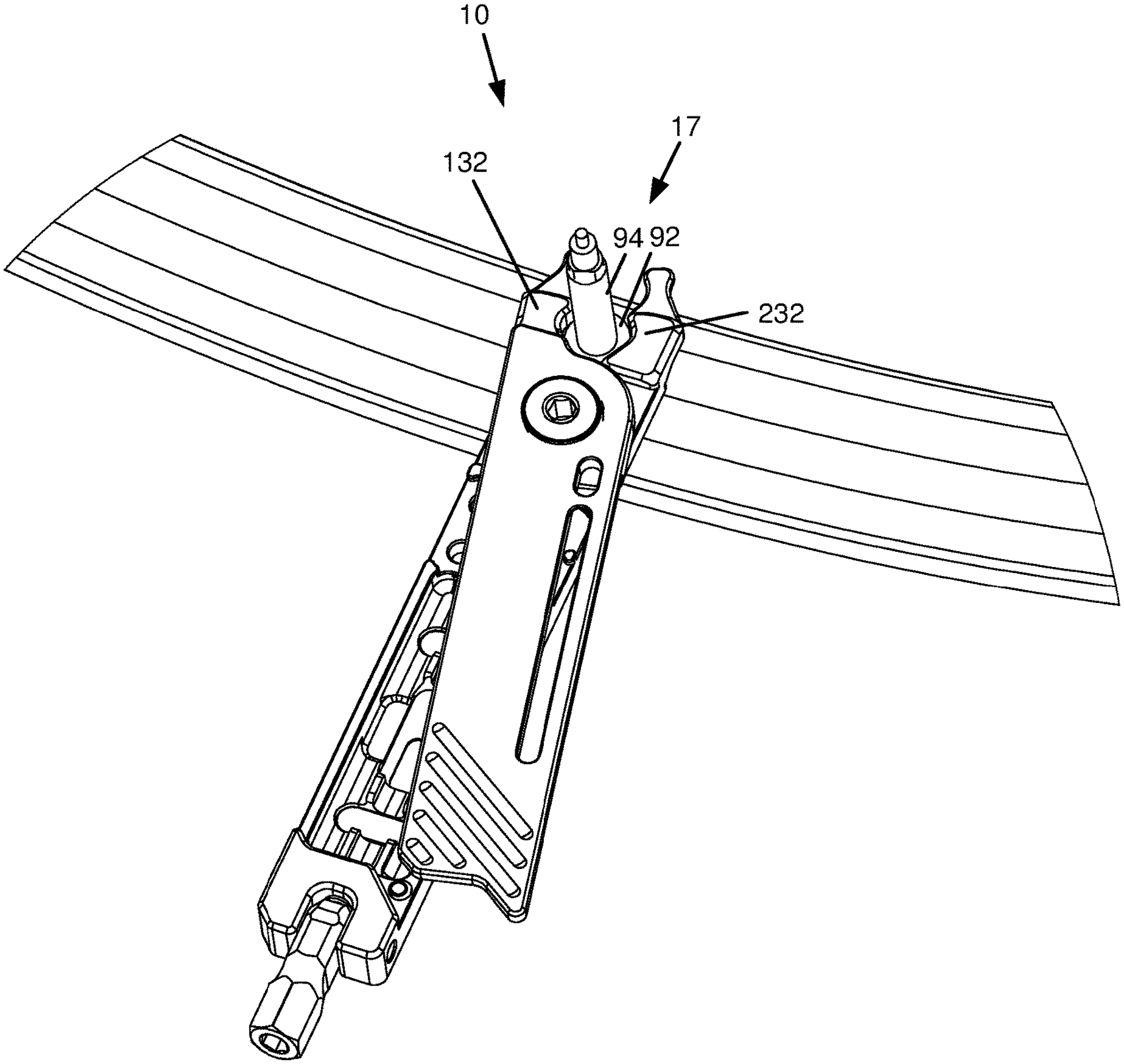
FIGS. 27, 28, 29, 30, 31 illustrate examples of use of the multi-tool of FIGS. 1 and 2.

FIG. 27 illustrates an example of use of multi-tool 10. For example, gripping jaws 17 of multi-tool 10 may be used to grip and/or hold an object. In one example, as illustrated in FIG. 27, gripping jaws 17, as formed by jaw sections 132 and 232, may be used to grip and/or hold a nut, such as a jam or retaining nut 92 (see also FIG. 31) of a valve stem 94 of an inner tube or a wheel rim, including, for example, an inner tube or a wheel rim of a bicycle. As such, with gripping jaws 17, jam or retaining nut 92 may be loosened and/or tightened or removed and/or installed.

Figure 28:
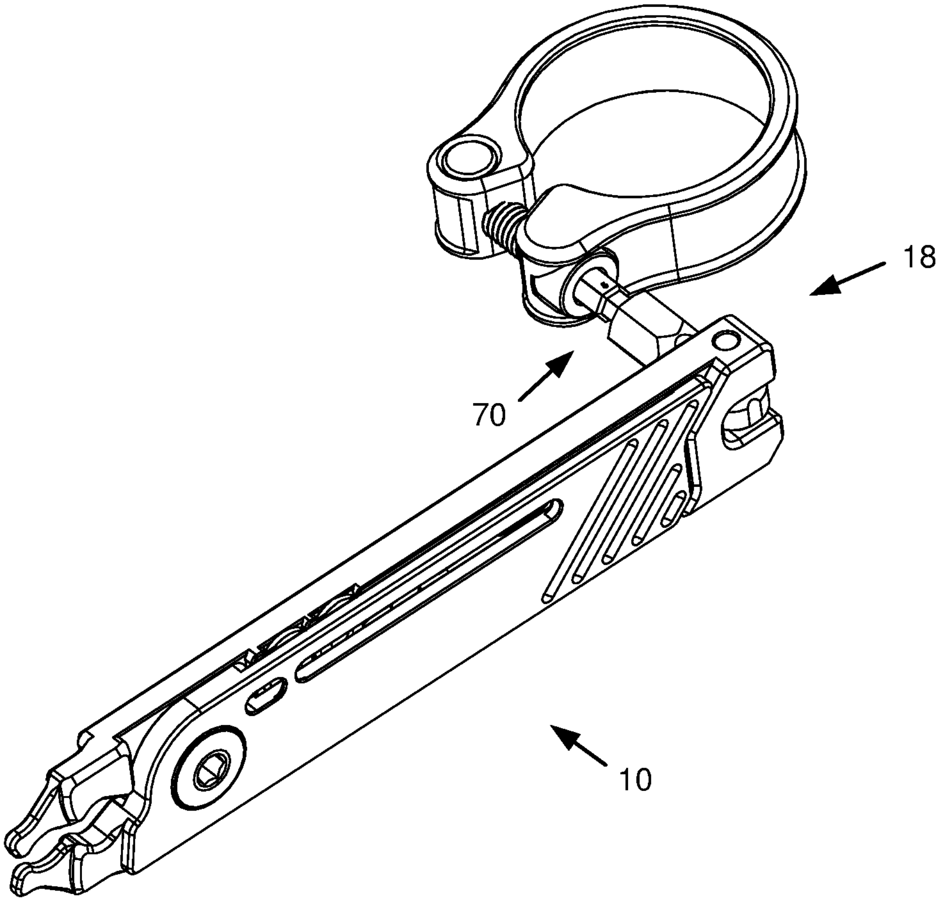
Figure 29:
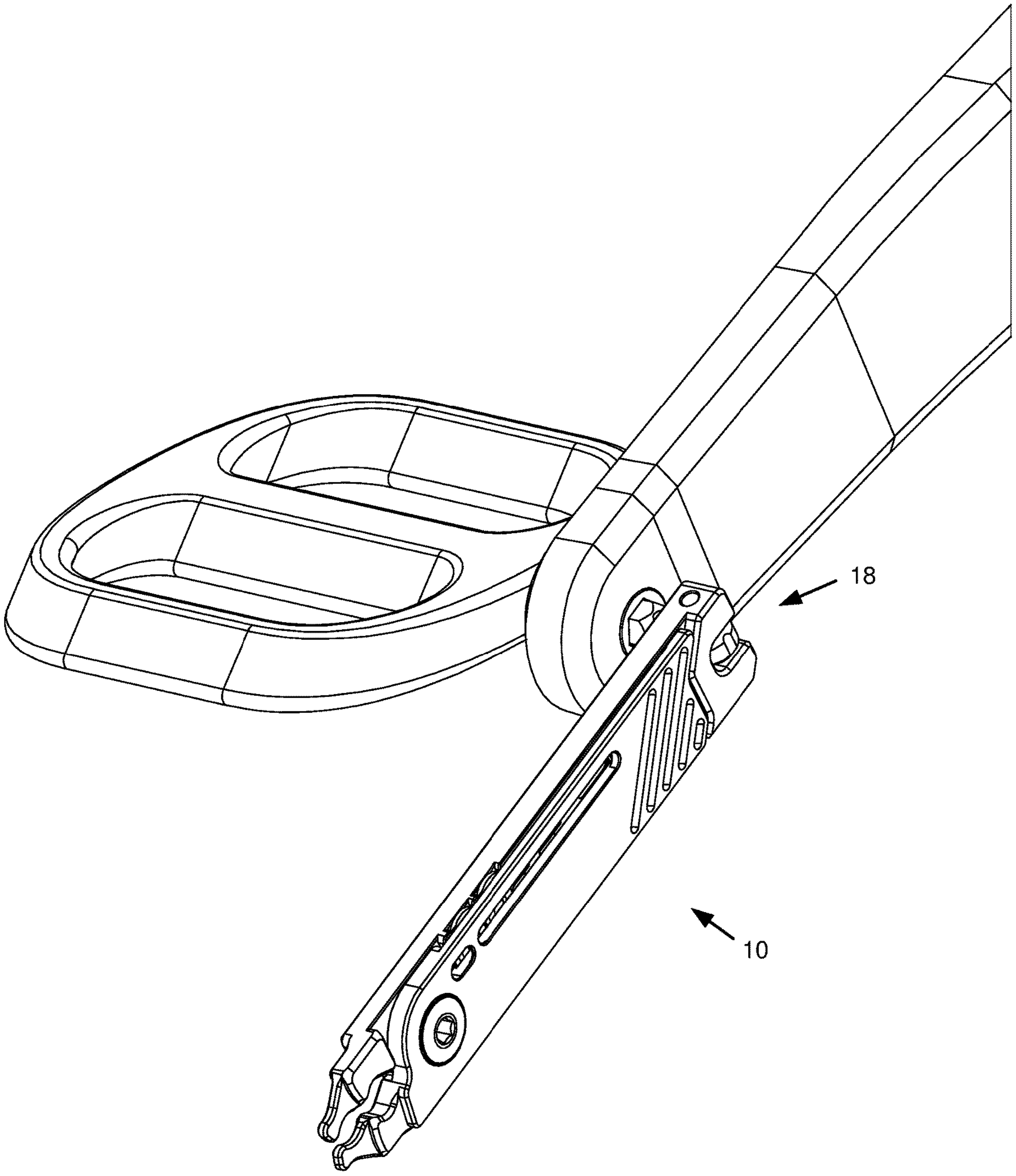

FIGS. 28 and 29 illustrate examples of use of multi-tool 10. For example, as illustrated in FIG. 28, bit holder 18 of multi-tool 10 may be used as a driver for an insert bit 70. In addition, as illustrated in FIG. 29, bit holder 18 of multi-tool 10 may be used as a hex key wrench.

Figure 30:
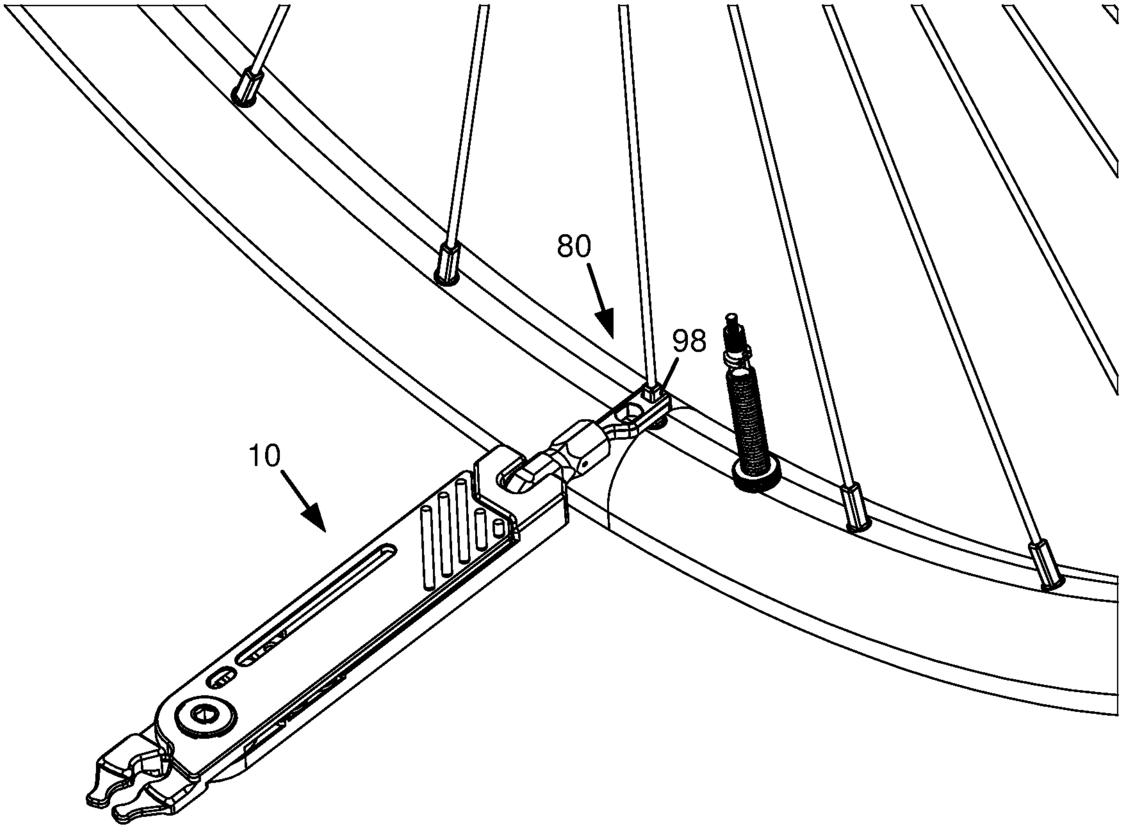
Figure 31:
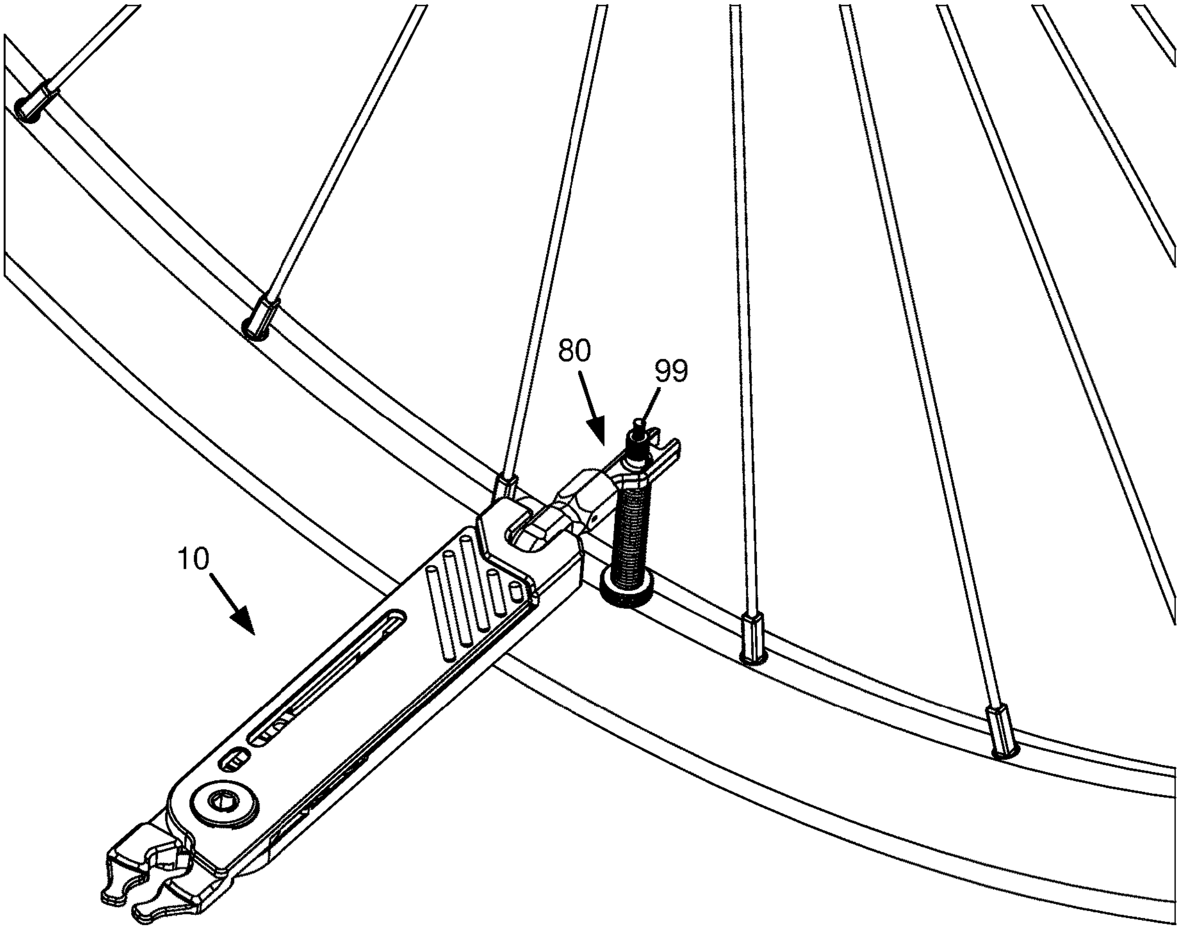

FIGS. 30 and 31 illustrate examples of use of multi-tool 10. For example, as illustrated in FIG. 30, multi-tool 10 may be used as a spoke wrench. More specifically, combination spoke wrench and valve core wrench 80 may be used as a spoke wrench to engage a spoke or a spoke nipple of a wheel rim, such as, for example, a spoke nipple 98 of a wheel rim of a bicycle. Thus, with combination spoke wrench and valve core wrench 80, spoke nipple 98 may be loosened and/or tightened and/or removed and/or installed. In addition, as illustrated in FIG. 31, multi-tool 10 may be used as a valve core tool. More specifically, combination spoke wrench and valve core wrench 80 may be used as a valve core tool to engage a valve core of a valve stem of an inner tube or a wheel rim, such as, for example, a valve core 99 of a valve stem an inner tube or a wheel rim of a bicycle. Thus, with combination spoke wrench and valve core wrench 80, valve core 99 may be loosened and/or tightened and/or removed and/or installed. As illustrated in the examples of FIGS. 30 and 31, a shank of wrench 80 may be inserted into bit holder 18, operated or driven by multi-tool 10, as an example of a bit driver.

Figure 32:
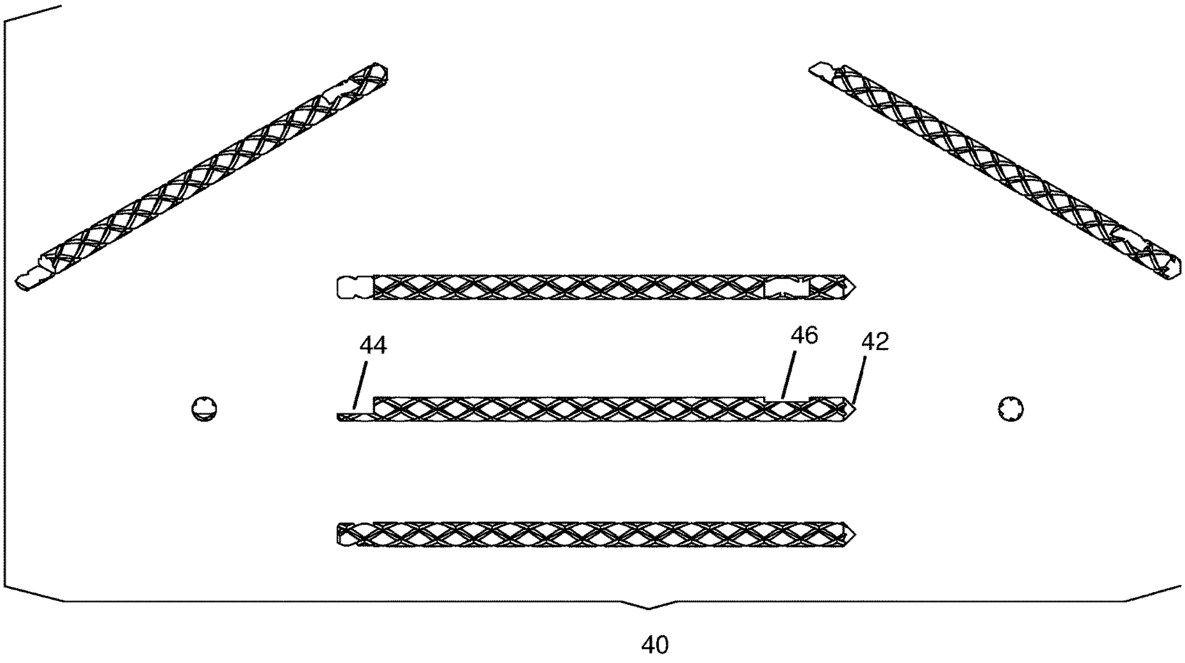
FIG. 32 includes views of an example of a rasp for use with the multi-tool of FIGS. 1 and 2.
Figure 33A:
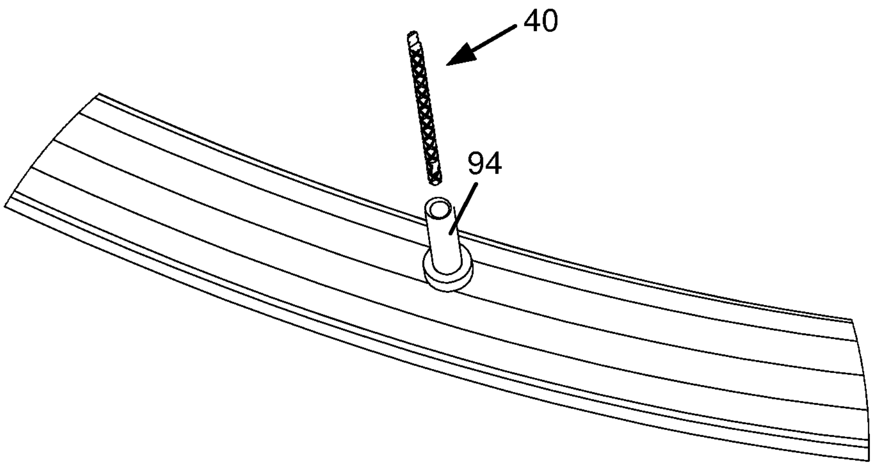
FIGS. 33A, 33B illustrate an example of use of the rasp of FIG. 32.
Figure 33B:
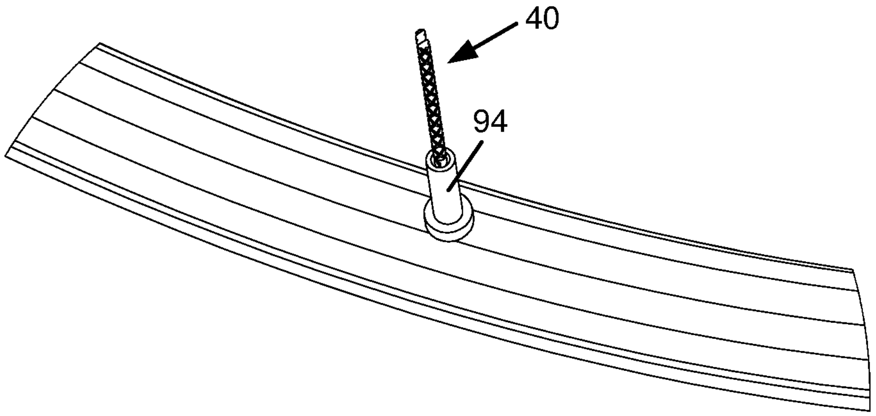

FIG. 32 includes views of an example of rasp 40, and FIGS. 33A, 33B illustrate an example of use of rasp 40. In the illustrated example, rasp 40 is of a slender rod of cylindrical shape with a pointed end 42 and a knurled surface. In one implementation, rasp 40 includes a notched end 44 and a recessed portion 46 such that recessed portion 46 accommodates crossbar 148 and notched end 44 contacts an end of recessed portion 142 when pointed end 42 is inserted into pocket 146 when rasp 40 is stored in storage area 140. As illustrated in the example of FIGS. 33A, 33B, rasp 40 may be used to clean a valve stem of an inner tube or a wheel rim, such as, for example, a valve stem 94 of an inner tube or a wheel rim of a bicycle.

A multi-tool as disclosed herein includes multiple features and provides multiple uses, including, for example, installing and/or removing a chain link of a roller chain, gripping jaws, bit driver, rasp storage, chain link storage, insert bit storage, and wrench storage.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A multi-tool, comprising:

a pair of plates having respective handle portions, joint portions, and head portions, the plates pivotally connected to each other at the joint portions, and to be pivoted relative to each other to establish an open position and a closed position of the plates; and a bit holder extended from an end of one of the plates, the bit holder including a socket to receive an insert bit, the handle portion of the one of the plates including a storage area to receive and store the insert bit, and in the closed position of the plates, the plates to overlap each other with the handle portion of the other of the plates to cover the storage area and opposite edges of the handle portion of the one of the plates.

2. The multi-tool of claim 1, the bit holder to be pivoted between a first position with the bit holder aligned with the one of the plates and a second position with the bit holder oriented at an angle to the one of the plates.

3. The multi-tool of claim 1, the storage area including a pocket formed in a side of the one of the plates, the pocket to receive and store the insert bit.

4. The multi-tool of claim 3, the storage area including a depression formed in the one of the plates within the pocket, one end of the insert bit to be pushed into the depression to tip an opposite end of the insert bit out of the pocket.

5. The multi-tool of claim 3, the storage area including an opening formed through the one of the plates within the pocket, the opening to provide access to the insert bit from an opposite side of the one of the plates.

6. The multi-tool of claim 3, the storage area including a magnetic element to retain the insert bit within the pocket.

7. The multi-tool of claim 3, the insert bit comprising a plurality of insert bits, and the pocket comprising a plurality of pockets, the plurality of pockets to receive and store the plurality of insert bits.

8. The multi-tool of claim 1, the handle portion of the one of the plates including another storage area to receive and store a chain link for a roller chain, in the closed position of the plates, the handle portion of the other of the plates to cover the another storage area.

9. The multi-tool of claim 1, the storage area formed in one side of the one of the plates, and the one of the plates including another storage area formed in an opposite side of the one of the plates to receive and store a wrench.

10. The multi-tool of claim 1, the handle portion of the other of the plates including another storage area to receive and store a rasp, the another storage area including a recessed region formed in the other of the plates to receive and store the rasp.

11. A multi-tool, comprising:

a pair of handles;

a joint to pivotally connect the handles;

a head to be opened and closed by actuation of the handles; and a bit holder extended from an end of one of the handles, the bit holder including a socket to receive an insert bit, the one of the handles including a storage area to receive and store the insert bit, and in a closed position of the handles, the other of the handles to cover the storage area and opposite edges of the one of the handles.

12. The multi-tool of claim 11, the bit holder to be pivoted between a first position with the bit holder aligned with the one of the handles and a second position with the bit holder oriented at an angle to the one of the handles.

13. The multi-tool of claim 11, the storage area including a pocket to receive and store the insert bit.

14. The multi-tool of claim 13, the storage area including a depression formed within the pocket, one end of the insert bit to be pushed into the depression to tip an opposite end of the insert bit out of the pocket.

15. The multi-tool of claim 13, the storage area including an opening formed through the one of the handles within the pocket, the opening to provide access to the insert bit from an opposite side of the one of the handles.

16. The multi-tool of claim 13, the storage area including a magnetic element to retain the insert bit within the pocket.

17. The multi-tool of claim 11, the insert bit comprising a plurality of insert bits, and the storage area including a plurality of pockets to receive and store the plurality of insert bits.

18. The multi-tool of claim 11, the one of the handles including another storage area to receive and store a chain link for a roller chain, in the closed position of the handles, the other of the handles to cover the another storage area.

19. The multi-tool of claim 11, the one of the handles including another storage area to receive and store a wrench, the storage area formed in one side of the one of the handles and the another storage area formed in an opposite side of the one of the handles.

20. The multi-tool of claim 11, the other of the handles including another storage area to receive and store a rasp, the another storage area including a recessed region formed in the other of the handles to receive and store the rasp.

* * * * *